US006256486B1

(12) United States Patent
Barany et al.

(10) Patent No.: US 6,256,486 B1
(45) Date of Patent: Jul. 3, 2001

(54) METHOD AND APPARATUS FOR MEASURING CO-CHANNEL INTERFERENCE

(75) Inventors: Peter A. Barany, McKinney, TX (US); Chandra Sekhar Bontu; Shamim Akbar Rahman, both of Nepean (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/517,381

(22) Filed: Mar. 2, 2000

Related U.S. Application Data

(60) Provisional application No. 60/153,158, filed on Sep. 9, 1999.

(51) Int. Cl.⁷ ........................................... H04B 1/10
(52) U.S. Cl. .................. 455/296; 455/450; 455/452; 455/67.3
(58) Field of Search .................. 455/450, 452, 455/423, 424, 62, 63, 67.3, 296; 370/347, 18, 350, 503; 379/60; 375/346, 362

(56) References Cited

U.S. PATENT DOCUMENTS

| 5,349,607 | | 9/1994 | Moreno . | |
|---|---|---|---|---|
| 5,396,539 | | 3/1995 | Slekys et al. | 379/59 |
| 5,818,876 | | 10/1998 | Love . | |
| 5,933,768 | * | 8/1999 | Skold | 455/296 |
| 5,946,625 | * | 8/1999 | Hassan | 455/447 |
| 5,959,984 | * | 9/1999 | Dent | 370/347 |
| 6,009,334 | * | 12/1999 | Grubeck | 455/456 |
| 6,052,594 | * | 4/2000 | Chuang | 455/450 |

FOREIGN PATENT DOCUMENTS

| 93 310 408 5 | 6/1994 | (EP) . |
|---|---|---|
| 98 308 268 6 | 4/2000 | (EP) . |
| WO 95/12936 | 5/1995 | (WO) . |

OTHER PUBLICATIONS

Peter Rysavy, Paper: *General Packet Radio Service (GPRS)*, Rysavy Research, for PCS Data Today Online Journal, pp. 1–5 (Sep. 30, 1998).
Paul Meche, *UWC–136 RTT Update*, Conference Call, TR45.3/98.04.06.07R4 (TR45/98.03.19R6), Universal Wireless Communications Consortium, pp. 1–5, 177–180, 198, 212–214, and 242–250 (Feb. 26, 1999).
Paul Meche, *Evolution of TDMA to 3G*, Universal Wireless Communications Consortium, pp. 1–19, dated at least as early as Jun. 7, 1999.
*UWC–136: TDMA's Migration to Third Generation*, Universal Wireless Communications Consortium, pp.1–2, printed from web site http://uwcc.org/ctiaw98/backg.htm, dated as early as Jun. 6, 1999.
*Universal Wireless Communications Consortium (UWCC) Announces UWC–136, The TDMA IS–136 Solution for Third Generation*, p. 1 (Feb. 23, 1998).

(List continued on next page.)

*Primary Examiner*—Vivian Chang
*Assistant Examiner*—John J Lee
(74) *Attorney, Agent, or Firm*—Bruce Garluk; James Harrison; Dan Hu

(57) ABSTRACT

A mobile communication system includes cell segments each associated with a base station. The base station includes transceivers capable of communicating over two sets of carriers. A first set of carriers carry circuit-switched traffic, while the second set of carriers carry packet-switched data. Co-channel interference measurements are made by mobile units or by a serving base station in each cell segment during communications of active bursts of traffic or control signaling. Such bursts may include a training sequence that is used by the measuring device to recreate a burst without interference contributions. Co-channel interference is then determined based on the recreated bursts and the received bursts. Multiple interference values may be derived and applied to an averaging filter to calculate the final interference contribution value.

29 Claims, 17 Drawing Sheets

OTHER PUBLICATIONS

*UWC–136: TDMA's Evolutionary Path to Third Generation*, Question & Answers, pp. 1–2, dated at least as early as Jun. 6, 1999.

John Scourias, *Overview of the Global System for Mobile Communications*, pp. 1–15, printed from web site http://www.gsmdata.com/overview.htm (Oct. 14, 1997).

*TR 45 TIA/EIA–136–121–A Draft Text*, pp. 1–26, Digital Control Channel Layer 1, (Nov. 20, 1998).

*TR 45 TIA/EIA–136–123–A Draft Text*, pp. i–xii, 1, 45, Digital Control Channel Layer 3, (Nov. 20,1998).

Nortel Networks, (Peter A. Barany, Eric N. Johnson, Shavantha Kularatna), *UWC–136 Edge Control Channel Options*, UWCC.GTF.PDFG/99.02.09, pp. 1–17 (Feb. 9, 1999).

Nortel Networks, (Peter A. Barany, Eric N. Johnson, Shavantha Kularatna), *Mechanisms for Implementing UWC–136 Edge Control Channels on a 200 KHZ RF Carrier*, UWCC.GTF.PDFG/99.03.09R1, pp. 1–27 (Mar. 9, 1999).

Marc Grant, *PDFG–RF Group Meeting Summary*, UWCC.GTF.PDFG/99.04.13, pp. 1–16 (Apr. 13, 1999).

Nortel Networks, (Peter A. Barany, Eric N. Johnson, Shavantha Kularatna and Shamim Akbar Rahman), *Impact on Maximum Cell Size of Robustness of the GSM SCH Burst Deployed in "Effective" 3/9 and 4/12 Frequency Reuse Patterns with Synchronized UWC–136 Edge 200 KHZ Base Stations*, UWCC.GTF.PDFG/99.04.13.26R2, pp. 1–14 (Apr. 13, 1999).

Nortel Networks, (Peter A. Barany, Eric N. Johnson, Shavantha Kularatna and Shamim Akbar Rahman), *Proposed New Optional Information Element for 30 KHZ DCCH Structure Message and Algorithm for Rapid Acquisition of Edge Compact PFCCH and PSCH*, UWCC.GTF.PDFG/99.05.05, pp. 1–4 (May 5, 1999).

Nortel Networks, (Peter A. Barany, Eric N. Johnson), *Concept Proposal for GPRS–136HS Edge, ETSI STC SMG2*, Revision 1.0, TDoc SMG2 530/99, Agenda Item 4.3, 6.2, 7.2.6.6, pp. 1–22 (May 31–Jun. 4, 1999).

Nortel Networks, (Peter A. Barany, Chandra Sekhar Bontu and Shamim Akbar Rahman), *Proposed Text for Section 3.2.10"Power Control and Interference Measurements" of GPRS–136HS Edge Concept Proposal*, Rev. 1.5, pp. 1–4 (Nov. 10, 1999).

ETSI STC SMG2 #34, Change Request, Aalborg, Denmark, pp. 1–4 (Jan. 10–14, 2000).

* cited by examiner

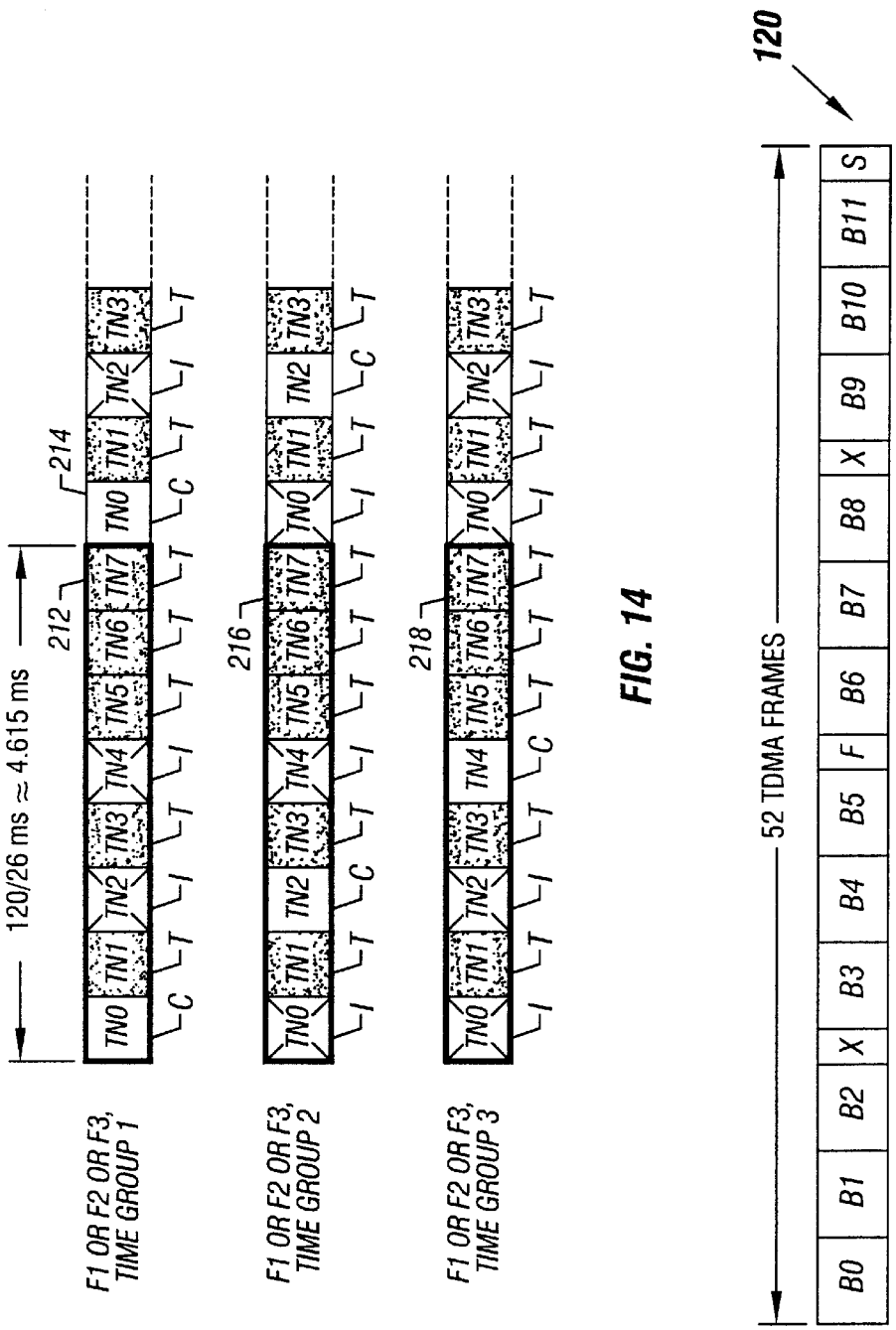

METHOD AND APPARATUS FOR MEASURING CO-CHANNEL INTERFERENCE

INTERFERENCE

This application claims priority under 35 U.S.C. §119(e) to U.S. Provisional Application Ser. No. 60/153,158, entitled "Method and Apparatus for Measuring Co-Channel Interference," filed Sep. 9, 1999.

BACKGROUND

The invention relates to a method and apparatus for measuring co-channel interference in a mobile communications system.

Mobile communications systems, such as cellular or personal communications services (PCS) systems, are made up of a plurality of cells. Each cell provides a radio communications center in which a mobile unit establishes a call with another mobile unit or a wireline unit connected to a public switched telephone network (PSTN). Each cell includes a radio base station, with each base station connected to a mobile switching center that controls processing of calls between or among mobile units or mobile units and PSTN units.

Various wireless protocols exist for defining communications in a mobile network. One such protocol is a time-division multiple access (TDMA) protocol, such as the TIA/EIA-136 standard provided by the Telecommunications Industry Association (TIA). With TIA/EIA-136 TDMA, each channel carries a frame that is divided into six time slots to support multiple (3 or 6) mobile units per channel. Other TDMA-based systems include Global System for Mobile (GSM) communications systems, which use a TDMA frame divided into eight time slots (or burst periods).

Traditional speech-oriented wireless systems, such as the TIA/EIA-136 and GSM TDMA systems, utilize circuit-switched connection paths in which a line is occupied for the duration of the connection between a mobile unit and the mobile switching center. Such a connection is optimum for communications that are relatively continuous, such as speech. However, data networks such as local area networks (LANs), wide area networks (WANs), and the Internet use packet-switched connections, in which communication between nodes on a communications link is by data packets. Each node occupies the communications link only for as long as the node needs to send or receive data packets. With the rapid increase in the number of cellular subscribers in conjunction with the rising popularity of communications over data networks such as intranets or the Internet, a packet-switched wireless data connection that provides convenient and efficient access to data networks, electronic mail, databases, and other types of data has become increasingly desirable.

Several packet-switched wireless connection protocols have been proposed to provide more efficient connections between a mobile unit and a data network. One such protocol is the General Packet Radio Service (GPRS) protocol, which complements existing GSM systems. Another technology that builds upon GPRS that has been proposed is the Enhanced Data Rate for Global Evolution (EDGE) technology, which offers even higher data rates. The enhancement of GPRS by EDGE is referred to as Enhanced GPRS (EGPRS).

In an EGPRS (Enhanced General Packet Radio Service) mobile communications system, measurements are made in traffic channels to determine co-channel interference. Traffic may be carried by a number of carriers using a predetermined frequency reuse scheme. Due to multiple uses of the same carrier frequency, co-channel interference may occur in which information (e.g., traffic) carried on one carrier (a first modulated carrier) in a first cell interferes with another carrier (a second modulated carrier) of the same frequency in a second cell. Downlink (base station to mobile unit) co-channel interference measurements are made by a mobile unit on the same RF carrier frequency as its assigned PDCH (packet data channel) during the logical idle frames (also referred to as search frames) when the serving cell is not transmitting. Since the serving base station of the cell in which a mobile unit is located is not transmitting traffic during these idle frames, the signals received by the mobile unit are due in large part to interference (including co-channel interference) from other cells and noise. Interference measurements are possible in an EGPRS system as well as other conventional cellular systems because neighboring base stations may be communicating during an idle frame of a serving base station.

However, in systems in which base stations are time synchronized, such as EGPRS Compact systems, idle frames in neighboring cells assigned the same carrier frequency occur generally at about the same time. EGPRS Compact provides for deployment of packet data services in a reduced spectrum (e.g., less than 1 MHz). In systems with time synchronized base stations, the idle frames substantially coincide on all RF carriers in all cells. Thus, a mobile unit that is in an idle period in one cell (the serving cell) may be unable to measure signaling from another cell (also idle) due to the time synchronization because there is theoretically nothing to measure during an idle period. Therefore, a need exists for a technique to perform co-channel interference measurements in systems in which base stations and cells are time synchronized, such as in EGPRS Compact systems.

SUMMARY

In general, according to one embodiment, a method of measuring co-channel interference in a cell segment of a mobile communications system includes receiving a burst on a carrier transmitted by a device in the cell segment and measuring co-channel interference in the cell segment based on predetermined information in the received burst.

In general, according to another embodiment, a method of determining co-channel interference in a mobile communications system includes receiving a burst containing a training sequence and recreating a copy of the burst without an interference contribution using a local copy of the training sequence code. The co-channel interference is then derived based on the received burst and the recreated copy of the burst.

Some embodiments of the invention provide one or more of the following advantages. Instead of having to wait for an idle period of a serving cell segment to make co-channel interference measurements, the interference measurements may be made during transmission of predetermined active bursts (such as traffic bursts), which provides more opportunities for making such measurements. By performing co-channel interference measurements during transmission of active bursts (instead of waiting for idle periods), the measurements are made possible in mobile networks in which idle periods in neighboring co-channel cell segments coincide (such as due to time synchronization of base stations in the cell segments).

Other features and advantages will become apparent from the following description, from the drawings, and from the claims.

BRIEF DESCRIPTION OF THE DRAWINGS

FIGS. 12–14 illustrate time-division multiple access (TDMA) frames for carrying data traffic and control signaling in accordance with some embodiments in the packet-switched data link of the mobile communications system of FIG. 1.

FIG. 15 illustrates a 52-frame multiframe for carrying packet data traffic and control signaling in the system of FIG. 1.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, reference is made to an EGPRS Compact mobile communications system in the described embodiments. In further embodiments, principles of the invention may be extended to other types of mobile communications systems, including packet-switched or circuit-switched systems.

Figure 1:
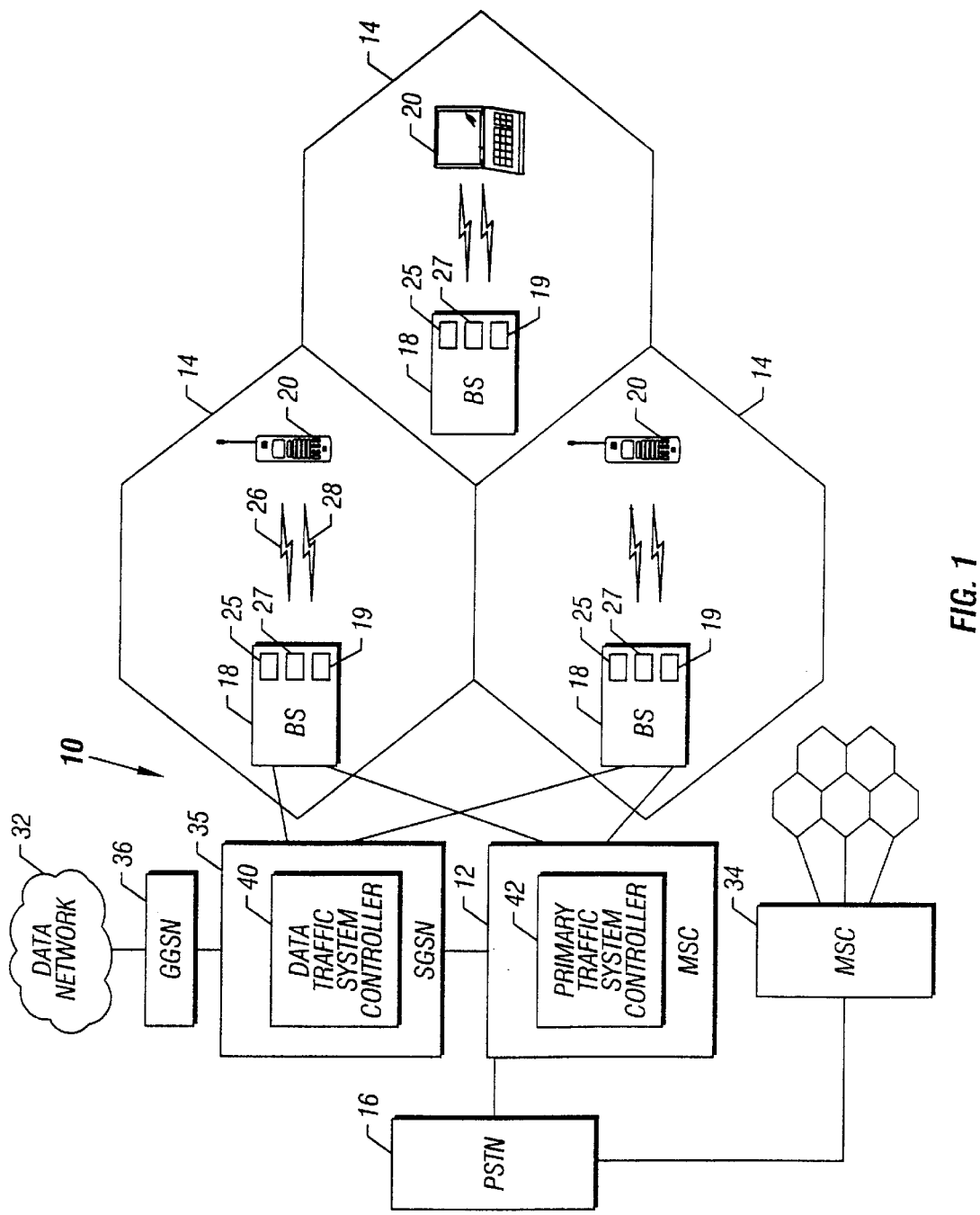
FIG. 1 is a block diagram of an embodiment of a mobile communications system.

Referring to FIG. 1, a mobile communications system 10, which may be a cellular or a personal communications services (PCS) system, includes a plurality of cells 14 each including a base station 18. The base station 18 is capable of communicating with mobile units 20 (e.g., mobile telephones, mobile computers, personal digital assistants, or other types of mobile units) over radio frequency (RF) wireless links. The base stations 18 are controlled by a mobile switching center (MSC) 12 for circuit-switched communications. For packet-switched or message-switched communications, the base stations 18 are controlled by a data traffic service node 35. In further embodiments, groups of base stations 18 may be controlled by base station controllers (not shown) that are in turn in communication with the MSC 12 and the data traffic service node 35.

In one embodiment, the base station 18 and mobile units 20 in each cell 14 are capable of communicating with two sets of carriers—a first set of carriers 26 for communicating circuit-switched traffic (e.g., speech data, short messaging services, and other circuit-switched data) and associated control signals; and a second set of carriers 28 for communicating packet-switched data traffic and associated control signals. In a further embodiment, packet-switched data traffic services may be provided without circuit-switched traffic services.

As used here, circuit-switched traffic is referred to as primary traffic and packet-switched data traffic is referred to as packet data traffic. Packet data traffic may refer to any traffic that is sent over a packet-switched network or link. One example of a connectionless, packet-switched network is an Internet Protocol (IP) network. IP is described in Request for Comments (RFC) 791, entitled "Internet Protocol," dated September 1981. Other versions of IP, such as IPv6, or other packet-switched standards may also be utilized in further embodiments. A version of IPv6 is described in RFC 2460, entitled "Internet Protocol, Version 6 (IPv6) Specification," dated December 1998.

Packet-switched networks such as IP networks communicate with packets, datagrams, or other units of data over the networks. Unlike circuit-switched networks, which provide a dedicated end-to-end connection or physical path for the duration of a call session, a packet-switched network is one in which the same path may be shared by several nodes. Packet-switched networks such as IP networks are based on a connectionless internetwork layer. Packets or other units of data injected into a packet-switched data network may travel independently over any network (and possibly over different networks) to a destination point. The packets may even arrive out of order. Routing of the packets is based on one or more addresses carried in each packet.

Generally, in accordance with some embodiments of the invention, a co-channel interference measurement scheme is implemented to assign traffic channels having the least interference in a communications session to carry traffic over the second set of carriers 28. Due to multiple uses of the same carrier frequency (frequency reuse) in a cellular network, co-channel interference may occur in which information (e.g., traffic) carried on one carrier (a first modulated carrier) in a first cell interferes with another carrier (a second modulated carrier) of the same frequency in a second cell. Unlike conventional systems, co-channel interference measurements are made during transmission of active bursts of traffic or control signaling instead of waiting for idle periods. Due to synchronization of base stations in cells, idle periods of all base stations within a predetermined mobile network coincide. Thus, a mobile unit or base station in an idle cell would be unable to measure co-channel interference from neighboring co-channel cells since those cells would also be idle. An "active burst" refers to a burst that carries some predetermined data, including a training sequence code as further described below. During idle frames, such active bursts are not communicated.

Figure 2:
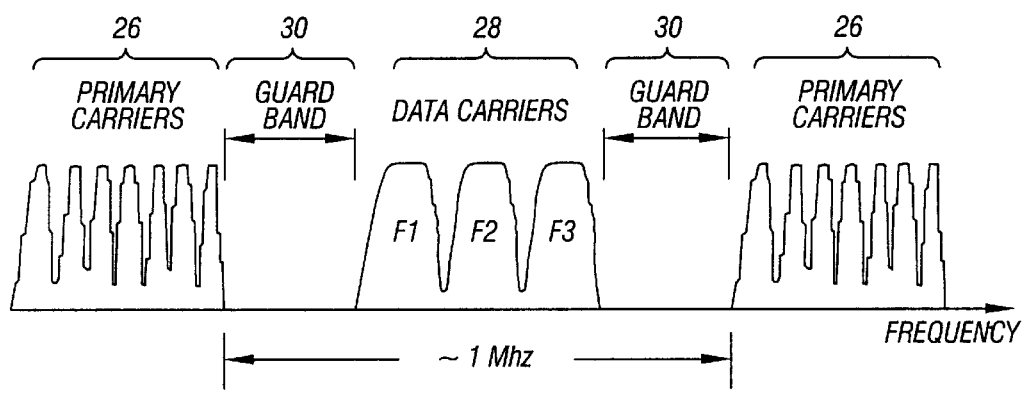
FIG. 2 illustrates primary carriers and data carriers for use in the mobile communications system of FIG. 1.

Referring further to FIG. 2, according to one example embodiment, the base stations 18 include transceivers 25 that send and receive 30-kHz (kilohertz) carriers 26 to carry circuit-switched traffic and associated control signals. In addition, packet data traffic and associated control signals are carried by 200-kHz packet data carriers 28, including three carriers F1, F2, and F3, which may be provided by transceivers 27 in each base station 18 in the same cell as the 30-kHz carriers. Guard bands 30 are defined between the first set of carriers 26 and the second set of carriers 28. The second set of three 200-kHz carriers 28 and guard bands 30 may be deployed in less than approximately 1 MHz (megahertz) of frequency spectrum in one embodiment. In further embodiments, however, additional packet data carriers may be allocated in increased frequency spectra. For example, a larger spectrum of 1.8 MHz, 2.4 MHz, 4.2 MHz, or more plus guard bands may be used in such further embodiments. Transceivers for sending and receiving carriers 26 and 28 may be included in the same base station 18 or in separate base stations. Although specific values are provided in describing carriers in the described embodiments, the invention is not to be limited in this respect since other embodiments may employ different forms of carriers.

The packet data traffic services provided in the system 10 may be complementary to the primary traffic services offered by a conventional circuit-switched system, such as a time-division multiple access (TDMA) system according to the TIA/EIA-136 standard from Telecommunications Industry Association. Alternatively, the primary traffic system may be part of a Global System for Mobile (GSM) communications system. The packet data traffic services in one embodiment may be according to an EDGE Compact or EGPRS Compact protocol as adopted by ETSI (European Telecommunications Standards Institute). Alternatively, packet data services may be according to an EDGE Compact Plus or EGPRS Compact Plus protocol.

As shown in FIG. 1, the MSC 12 includes a primary traffic system controller 42 that controls the establishment, processing, and termination of circuit-switched calls (e.g., speech, short messages, and so forth) between or among mobile units 20 in one or more cells 14 or between or among mobile units 20 in a cell 14 and a wireline device (e.g., a telephone) coupled to a public switched telephone network (PSTN) 16. More than one MSC (such as an MSC 34 associated with a different service provider) may be included in the mobile communications system 10.

The data traffic service node 35 includes a data traffic system controller 40 that controls the establishment, processing, and termination of packet-switched communications. In one embodiment, the data traffic service node 35 may be a serving GPRS support node (SGSN) according to the General Packet Radio Service (GPRS) protocol. Also in accordance with GPRS, the SGSN 35 communicates with a gateway GPRS support node (GGSN) 36, which provides an interface to a packet-switched data network 32. Example data networks 32 include local area networks (LANs), wide area networks (WANs), the Internet, or other types of private or public networks. More generally, the nodes 35 and 36 may include any system or systems that are capable of controlling packet-switched data communications between a mobile unit 20 and the packet-switched data network 32. Further, the nodes 35 and 36 may be implemented in the same platform as the MSC 12 in an alternative embodiment.

Effectively, two wireless links are provided for mobile units 20 in the cells 14 controlled by the MSC 12: a packet data link, including the carriers 28, the base stations 18, and the data traffic system controller 40, to provide relatively high-speed packet-switched communications between mobile units 20 and the data network 32; and a primary traffic link, including the carriers 26, the base stations 18, and the primary traffic system controller 42 to provide speech and other circuit-switched communications between mobile units 20 or between a mobile unit 20 and a PSTN unit. As used here, "link" may refer to one or more communications paths or transport media and any associated devices or systems used to route signals over such communications paths or transport media.

In one example embodiment, the primary traffic system controller 42 controls communications according to the TLA/EIA-136 protocol. In another example, the primary traffic system controller 42 may control communications according to the GSM protocol, which uses 200-kHz carriers, instead of 30-kHz carriers, to carry primary traffic. In the primary traffic link, TDMA frames may be used to carry traffic and control signals. A frame according to TIA/EIA-136 includes six time slots, while a frame according to GSM includes eight time slots. In the packet data link, frames are also defined to carry data traffic and associated control signals. The frame for the packet data link may be similar to a GSM frame with eight time slots (also referred to as burst periods) TN0–TN7.

In one arrangement, each cell may be divided into three sectors. The primary traffic link may utilize a 7/21 channel reuse pattern, by way of example. The frequency reuse distance D for a 7/21 channel reuse pattern is large enough such that the C/I (carrier-to-interference) performance of control channels on the primary traffic link is robust.

Figure 3:
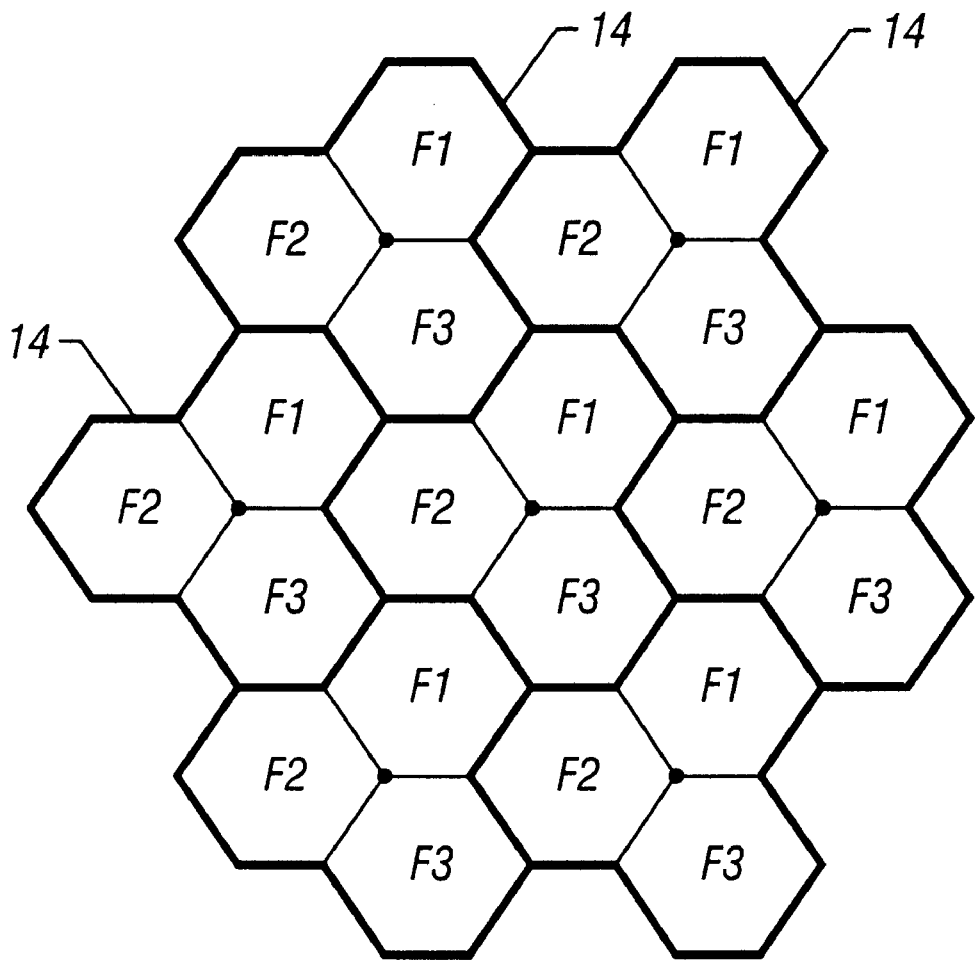
FIG. 3 illustrates a 1/3 channel reuse pattern for packet data traffic communicated over a packet-switched data link in the mobile communications system of FIG. 1.

With the packet data link, each base station site may be allocated three frequencies F1, F2, and F3, one per sector, using a 1/3 frequency reuse pattern for data traffic, as illustrated in FIG. 3. One frequency Fx is allocated per sector of each cell 14. Traffic channels in the packet data link may employ various mechanisms, including link adaptation and incremental redundancy, to provide more robust C/I performance in a 1/3 channel reuse pattern. For control channels, a higher effective channel reuse pattern may be employed to address the co-channel interference problem. A higher effective channel reuse plan is created by assigning cells or cell sectors to different combinations of frequencies and time. As a result, a higher effective channel reuse pattern (e.g., 3/9, 4/12, 7/21, etc.) that is based on both frequency and time can be achieved as compared to a reuse plan based only on the available frequencies, such as performed in conventional mobile systems.

Although reference is made to cell sectors in this description, the same method and apparatus may be applied to non-sectored cells. More generally, a cell segment may include a cell, a cell sector, or any other portion of a cell.

To assign mobile units to traffic channels with reduced interference in accordance with some embodiments, mobile units determine an estimated co-channel interference from a first set or tier of co-channel cell segments (cell segments having the same frequency as the serving cell segment) using measurements that are already being made by the mobile units during receipt of traffic channel bursts for purposes of equalization. In communicating traffic bursts, a mobile unit measures the RSSI (received signal strength indicator) in each burst over a training sequence period. Equalization is performed to adapt for multipath effects and Doppler effects. Multipath propagation results from reflection, diffraction, and scattering of radio signals caused by obstructions along the path of transmission. Doppler effects refer to shifts in frequency and wavelength of a radio signal resulting from variations in relative speeds of a mobile unit and a base station.

Figure 4:
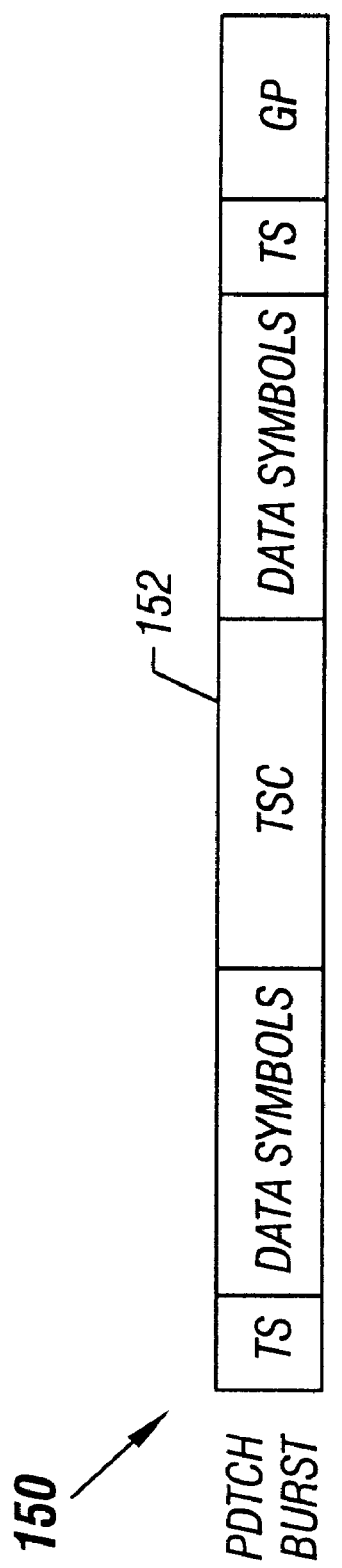
FIG. 4 illustrates a traffic burst communicated between a mobile unit and a base station in the mobile communications system of FIG. 1.

Referring to FIG. 4, each burst 150 of the packet data traffic control (PDTCH) includes a training sequence code (TSC) 152, which in one embodiment is 26 symbols in length. Data symbols are carried on either side of the TSC 152. In one embodiment, each symbol has a period of about 3.69 microseconds (µs), for example. A typical burst is made up of 156.25 symbols. In accordance with some embodiments, the TSCs of the first group or tier of co-channel cell segments may be used for estimating co-channel interference during transmission of traffic bursts or control bursts (active bursts) in the serving cell. This is contrasted to other mobile communications systems (e.g., EGPRS systems), in which channel measurements are made during idle periods of the serving cell. In such other mobile communications systems, base stations are not time synchronized so that neighboring cell segments are likely to be transmitting traffic bursts during idle frames of a serving cell segments. In these systems, transmissions of the neighboring cell segments may be measured when the serving cell is idle to determine co-channel interference.

However, in a mobile communications system that includes time-synchronized base stations, such as EGPRS Compact systems, idle frames of co-channel cell segments coincide. As a result, transmissions of neighboring cell segments are not available for measuring co-channel interference during an idle period of the serving cell. To overcome this, a mobile unit utilizes the local copy of the TSC in determining the estimated co-channel interference. The local copy of the TSC is used by the mobile unit to estimate (or recreate) the transmitted signal (from the base station) during the training sequence. Co-channel interference is then determined from a comparison of the received traffic signals (which includes interference contributions) with the recreated traffic signals (without interference contributions) during the training sequence of a PDTCH burst. Measurements are not taken on control bursts since the base stations of neighboring co-channel cell segments either do not transmit or transmit at a constant power output during idle frames.

Base stations may use similar techniques to measure co-channel interference. A training sequence is included in each burst sent by the mobile unit to the base station in the uplink path. One such burst is the PACCH (packet associated control channel).

Figure 5:
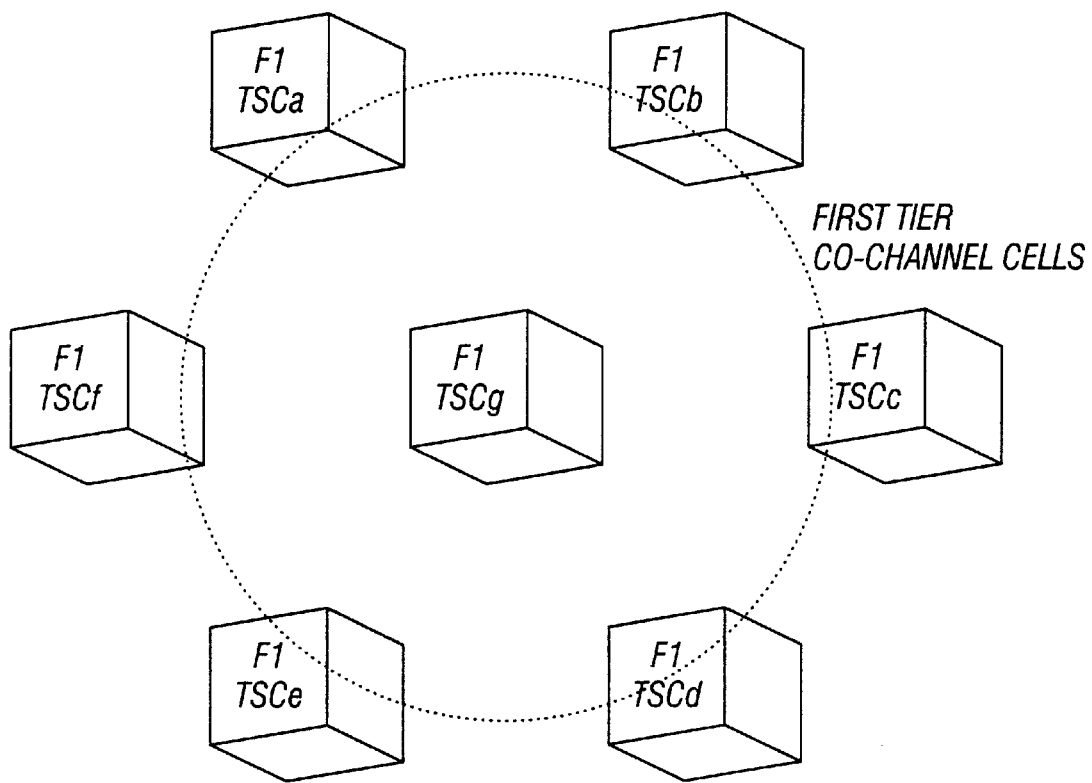
FIG. 5 illustrates assignment of training sequence codes in accordance with an embodiment.

Referring to FIG. 5, a first tier of co-channel cell segments may be assigned predetermined training sequence codes (TSCs). In the illustrated embodiment, 8 TSCs are illustrated, each assigned to a corresponding one of the cell segments. The illustrated co-channel cell segments in the first tier have carrier frequency F1. The same arrangement is applicable for the other carriers F2 and F3. It is during the training sequence period, which takes up 26 symbols in one embodiment, that the signal measurement is made.

FIG. 5 shows one possible TSC assignment among the first tier of co-channel segments that is employed for determining co-channel interference being experienced by a mobile unit. In the example given, the serving cell segment (the cell segment of the mobile unit making the received or downlink signal strength measurement) is assigned TSCg, while the co-channel cell segments are assigned TSCa–TSCf. In the TSC assignment, the values of TSCa, TSCb, TSCc, TSCd, TSCe, TSCf, and TSCg should not be equal (this depends upon antenna half-power bandwidths and/or implementation of adaptive antennas). The TSC for each cell segment may be communicated by the base station to the mobile unit as part of a (1) PSCH (synchronization channel) burst, (2) a PBCCH (broadcast control channel) burst, or (3) a channel assignment message. In the PSCH burst, the TSC may be part of the BSIC (base station identity code), and in the PBCCH burst, the TSC may be part of the packet system information type 2 (PSI 2).

Figure 6:
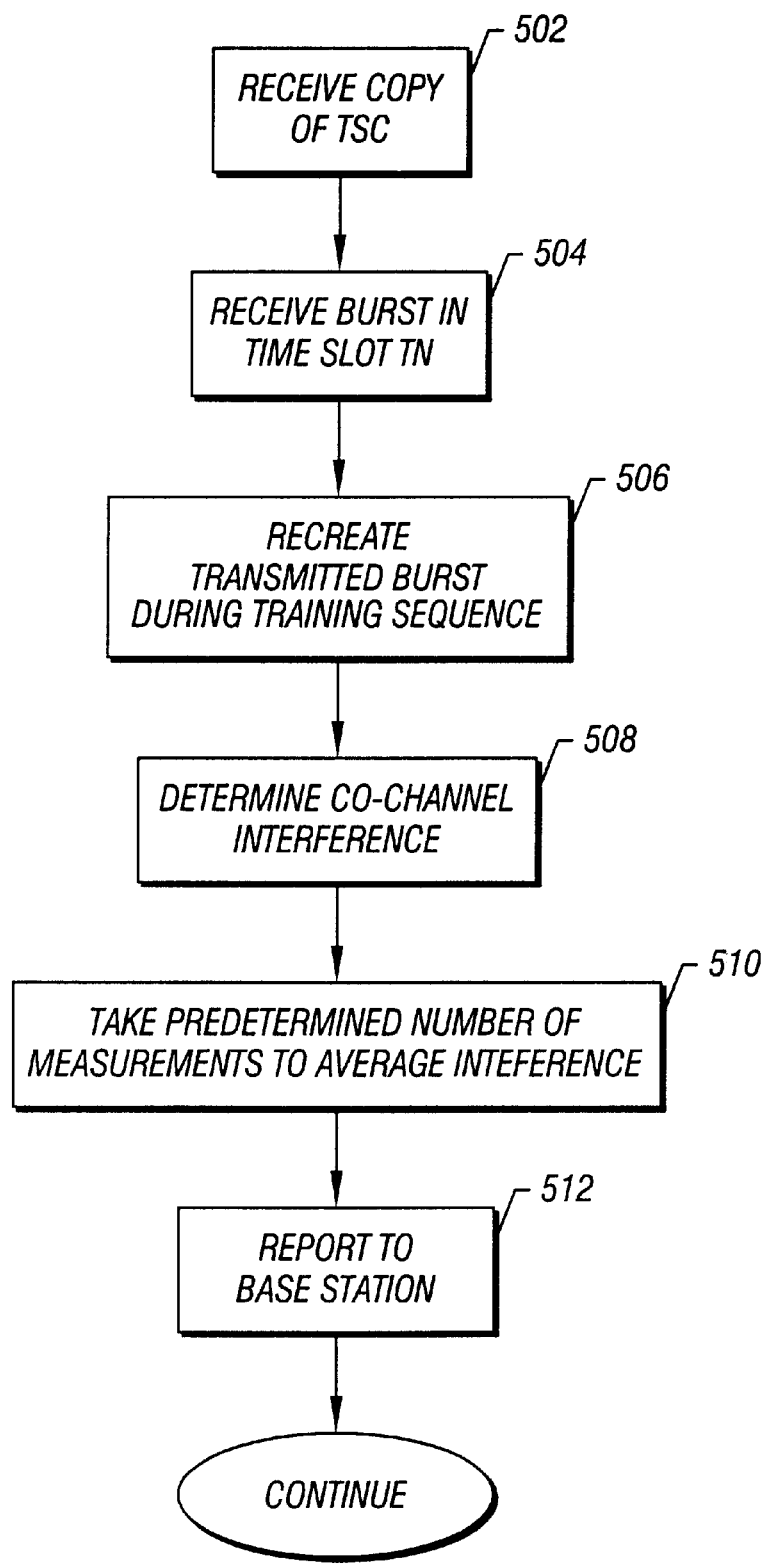
FIGS. 6 and 7 are flow diagrams of embodiments of processes to estimate co-channel interference.

Referring to FIG. 6, a general procedure for estimating co-channel interference among a predetermined group (e.g., the first tier) of co-channel cell segments is described. The flow diagram represents acts performed by a mobile unit in estimating co-channel interference. However, a similar procedure may be performed by the base station. A transmitted signal between a base station and a mobile unit may be affected by various components, including co-channel interference, adjacent channel interference, and noise. However, it is expected that contributions from adjacent channel interference is substantially less than co-channel interference. In the ensuing discussion, it is assumed that the estimated interference includes mainly co-channel interference. However, it is to be understood that adjacent channel interference, noise, and other distortions may form part of the estimated interference value.

Figure 8:
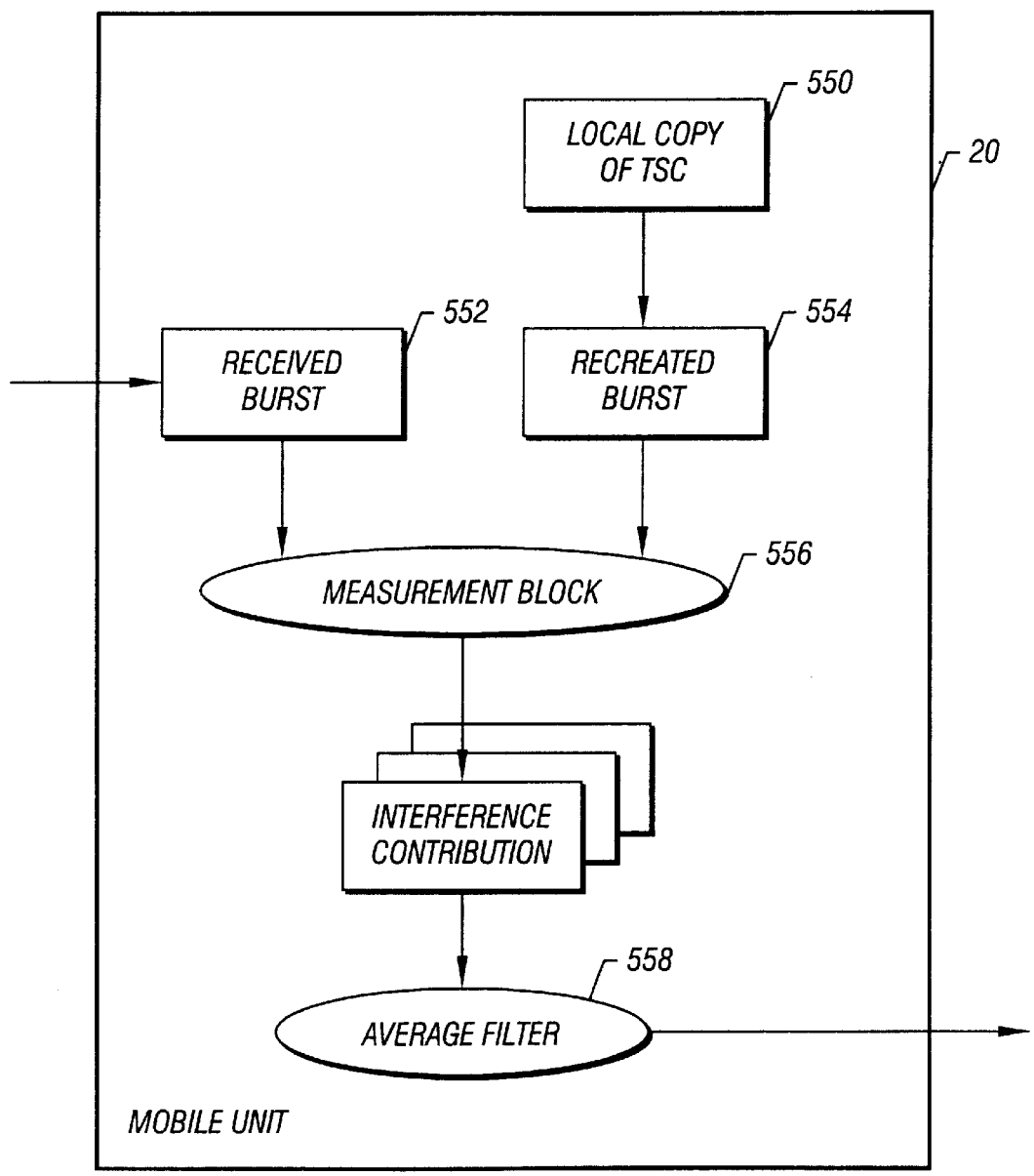
FIG. 8 is a block diagram illustrating blocks involved in co-channel interference measurements in accordance with an embodiment.

Referring further to FIG. 8 in conjunction with FIG. 6, the mobile unit 20 receives (at 502) a copy 550 of the TSC assigned the serving base station in a predetermined burst, e.g., PSCH or PBCCH. For each given time slot (each of TN0–TN7) of a frame, the mobile unit receives (at 504) a traffic burst (PDTCH) 552 that includes a training sequence. Using the local copy of the TSC of the serving base station, the transmitted version 554 (without interference contributions) of the burst under measurement is estimated or recreated (at 506). The recreated burst and received burst are then compared by a measurement routine 556 to determine (at 508) the interference.

A predetermined number of interference measurements may be taken (at 510) and fed to an averaging filter 558 to average the estimated interference over multiple measurements to improve accuracy. The estimated interference values are then reported (at 512) to the base station at predetermined intervals.

The following provides a more specific procedure according to one embodiment for estimating interference. The received signal at the mobile unit may be represented as r(t). The symbol-spaced sampled complex envelope of the received signal 552 (FIG. 8), referred to as $\{r_n\}$, may be expressed as:

$$r_n = \sum_{i=-L1}^{L2} c_i u_{n-i} + z_n \qquad \text{(Eq. 1)}$$

where $\{c_i\}$ represents the tap weights of the equivalent channel, $\{u_i\}$ represents the complex symbols of the local copy of the TSC 550 (FIG. 8), $z_n$ represents the interference and noise contribution, and L1 and L2 are channel dispersion parameters.

The following calculations may be performed by the measurement block 556 shown in FIG. 8. The equivalent channel response ($\overline{W}$) is estimated using the first N symbols of the TSC of the received burst r(t), where N is less than 26, according to the following:

$$\overline{W} = R^{-1} \overline{P}. \qquad \text{(Eq. 2)}$$

The equivalent channel response $\overline{W}$ corresponds to the combined channel response of the physical channel and the transmit and receive filter responses. The value R is the K×K correlation matrix of the complex symbols of the TSC, represented as $\{u_n\}$. R is expressed as follows:

$$R = E[\overline{u}_n \overline{u}_n^H]. \qquad \text{(Eq. 3)}$$

Thus, R is the expected value (E[ ]) of the product of $\overline{u}_n$ and $\overline{u}_a^H$, where $\overline{u}_n^H$ is the Hermetian transform of $\overline{u}_n$, which is the transposition and complex conjugate of the matrix $\bar{u}_n$. K is based on the expected maximum equivalent channel dispersion and represents the number of symbols over which the equivalent channel dispersion is spanning; that is, $$K=L1+L2+1. \quad \text{(Eq. 4)}$$

The complex symbols of the TSC, $\bar{u}_n$, are expressed as follows:

$$\bar{u}_n=[u_n, u_{n-1}, \ldots, u_{n-k+1}]^T. \quad \text{(Eq. 5)}$$

$\bar{P}$, as used in Eq. 2, denotes the K×1 cross-correlation vector between the complex symbols of the TSC, $\{u_n\}$, and the received signal sample $\{r_n\}$. $\bar{P}$ is expressed as follows:

$$\bar{P}=E[\bar{u}_n r_n^*]. \quad \text{(Eq. 6)}$$

Thus, $\bar{P}$ is the expected value of the product of $\bar{u}_n$ and $r_n^*$. From the estimated equivalent channel response, $\bar{W}$, the interference and noise contribution (IN) is calculated for the last M (=26−N) symbols of the TSC as follows:

$$IN = \frac{1}{M}\sum_{k=1}^{M}|r_k - \bar{W}\cdot\bar{u}_k|^2 \quad \text{(Eq. 7)}$$

The product of $\bar{W}$ and $\bar{u}_k$ ($\bar{W}\cdot\bar{u}_k$) represents the estimated transmitted signal with some errors. Thus, the interference estimation or measurement is based on a comparison of the received burst $r_k$ and the recreated burst ($\bar{W}\cdot\bar{u}_k$). The accuracy of IN improves as M increases. However, the estimated equivalent channel response $\bar{W}$ may suffer because of reduced N. Optionally, the symbols in the immediate vicinity on either side of TSC in a PDTCH burst may also be used in estimating interference.

In another embodiment, instead of using M and N values that are less than the total number of symbols in the training sequence (e.g., 26), all of the symbols (e.g., N=26) in the training sequence may be used to determine the equivalent channel response $\bar{W}$. The interference and noise contribution IN can then be derived using all of the symbols (e.g., M=26). This improves accuracy in calculating the interference and noise contribution IN, but it comes at the expense of more processing time.

The procedure discussed for calculating IN may also be performed in both directions by scanning TSC from left-to-right and right-to-left. By scanning in both directions, IN can be obtained for the first M symbols (represented as IN1) of the TSC, and IN can be obtained for the last M symbols (represented as IN2) of the TSC. From IN1 and IN2, a value $SS_{CH,n}$ can be calculated as follows:

$$SS_{CH,n}=(IN1+IN2)/2, \quad \text{(Eq. 8)}$$

which is the average of the IN1 and IN2 values. Once several samples of $SS_{CH,n}$ have been obtained, they may be passed through the averaging filter 558 (FIG. 8) as follows:

$$\gamma_{CH,n}=(1-d)*\gamma_{CH,n-1}+d*SS_{CH,n}\gamma_{CH,0}=0, \quad \text{(Eq. 9)}$$

where d is the forgetting factor, expressed as:

$$d=1/MIN(n,N_{AVG\_I}). \quad \text{(Eq. 10)}$$

The parameter n is the iteration index that is incremented with each new sample, and $N_{AVG\_I}$ represents the last number of samples over which the measured interference values should be averaged. The value d is thus the inverse of the minimum of n and $N_{AVG1}$. If n is less than $N_{AVG\_I}$, then the measured interference is averaged over the last n samples; otherwise, the last $N_{AVG\_I}$ samples are used. The value of $N_{AVG\_I}$ is communicated by the base station to the mobile unit. Once valid $\gamma_{CH,n}$ values have been calculated, they are transmitted by the mobile unit to the base station every given time period.

Figure 7:
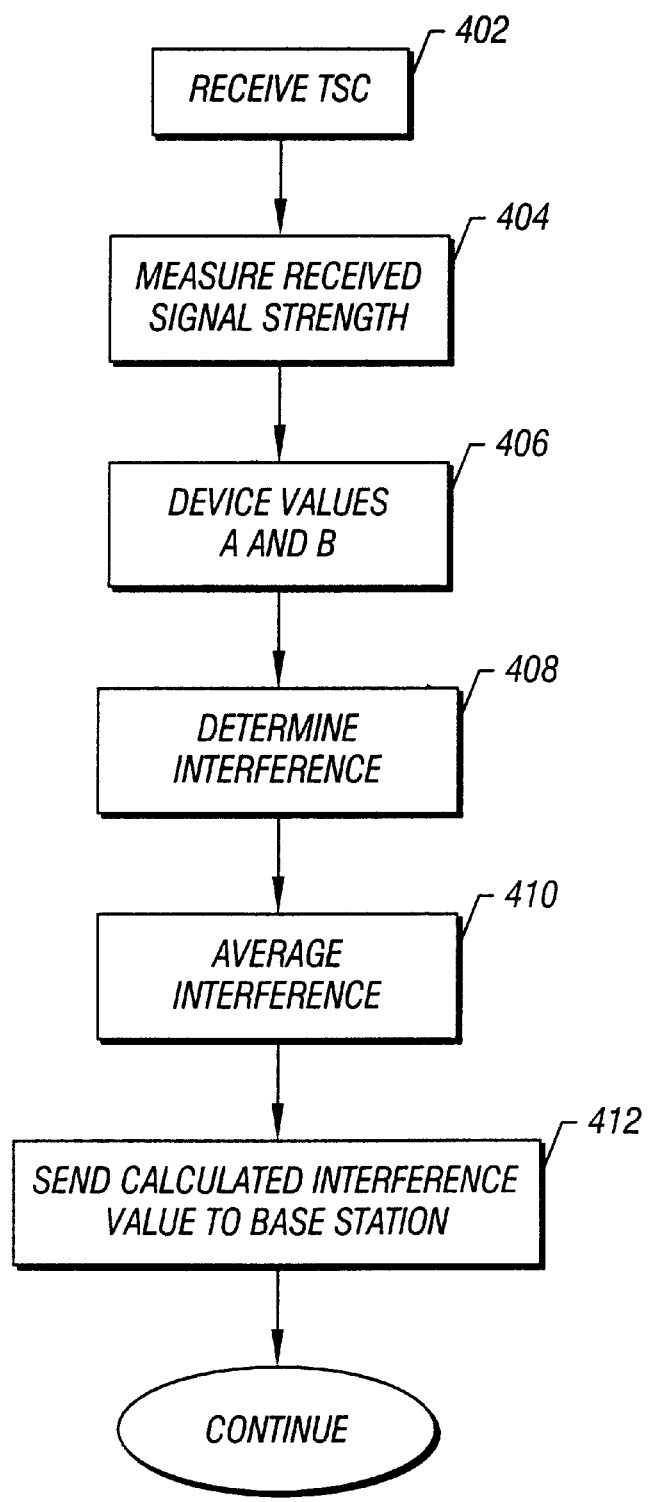

Referring to FIG. 7, the procedure in accordance with another embodiment for determining co-channel interference in a given cell segment may be as follows. This alternative co-channel interference measurement technique relies on synchronization of the serving cell segment and the neighboring co-channel cell segments. Some errors may be introduced if the serving cell segment and co-channel cell segments are not synchronized to within tight tolerances. In general, the co-channel interference technique associated above is more accurate than the FIG. 7 embodiment described below.

A mobile unit retrieves (at 402) the TSC assignment of the cell segment from a PSCH or PBCCH burst (assume TSCg in the illustrated example of FIG. 5). As part of the equalization process, the mobile unit measures (at 404) the received signal strength during downlink communications of traffic channel (PDTCH) bursts. The measurement is performed in the TSCg training sequence of the traffic burst. Using the measured data, two values (A and B) may be derived (at 406). The value A represents the downlink (base station to mobile unit) signal strength associated with TSCg and some noise. In other words, the value A is the measured signal strength without the co-channel interference value (interference from the other co-channel cell segments of the first tier) and other interference components (e.g., adjacent channel interference). The value B represents the total received signal strength as measured by the mobile unit. Thus, using measured values A and B, the co-channel interference can be derived or estimated by subtracting A from B (B−A).

According to this embodiment, the values A and B can be derived as follows. A parameter r(t) is defined that represents the complex envelope of the received signal at a mobile unit during the TSCg training sequence period (including 26 symbols). The parameter r(t) is defined below.

$$r(t)=s_0(t)+I(t)+n(t), \quad \text{(Eq. 11)}$$

where $s_0(t)$ represents the low pass complex envelope of TSCg, and I(t) is the interference arising from the first tier of co-channel cell segments, which include TSCa through TSCf in FIG. 5 (6 co-channel cell segments). However, there are a total of 8 training sequences; therefore, depending upon the non-uniformity of the size of the co-channel cell segments, the first tier of co-channel cell segments may conceivably include 7 co-channel cell segments. Finally, the parameter n(t) represents the AWGN (additive white Gaussian noise). From r(t) and $s_0(t)$, the value of A can be determined from the following equation:

$$A=\int_0^T r(t)s^*_0(t)dt \quad \text{(Eq. 12)}$$

where T is the TSC period (26 symbols) and $s^*_0(t)$ is the complex conjugate of $s_0(t)$. The value of B can be determined from the following equation:

$$B=\int_0^T r(t)r^*(t)dt, \quad \text{(Eq. 13)}$$

where $r^*(t)$ is the complex conjugate of r(t).

The estimated downlink co-channel interference can then be determined (at 408) by calculating B−A. The value B represents the total downlink received signal strength measured by the mobile unit (including interference and noise).

The value A represents the downlink received signal strength derived by the mobile station not including interference (including only the signal strength of the cell segment associated with TSCg and noise). The noise component is subtracted out in subtracting A from B.

The co-channel interference measurements may be performed continuously over all the slots or whenever there is an opportunity (measurements made during the TSC periods in the slots). The measured interference values may be averaged (at 410) over a multiframe (e.g., a 52-frame multiframe) or any recommended time period or number of samples and sent (at 412) to the base station on a predetermined message.

In both embodiments described in FIGS. 6 and 7, since a mobile unit does not need to wait for idle frames, there are more opportunities for the mobile unit to make measurements as compared to other systems, such as EGPRS systems which do not employ synchronized cells. The method and apparatus according to one embodiment may provide a mobile unit with 1,352 measurement opportunities per 52-frame multiframe (52×26), compared to a much smaller number of measurement opportunities in other types of mobile communications systems, in which the mobile unit or base station must wait for idle frames. Further, a small inter-arrival delay between signals from the several base stations of the co-channel cell segments at the mobile unit does not significantly affect the measurement accuracy.

Another advantage of the mechanism proposed here is that, for traffic channels where the reuse distance is not as good as for control channels (e.g., a 1/3 frequency reuse pattern versus a 4/12 frequency reuse pattern), the TSC orthgonality characteristics in the presence of base station synchronization gives co-channel rejection capabilities to the mobile unit receiver.

The following describes in more detail communications of control and traffic signaling in the mobile communications system 10. However, the described embodiments are for illustrative purposes, since other embodiments may have other arrangements.

Due to the vulnerability of control signals carried by the packet data carriers, the 1/3 channel reuse pattern used for traffic channels may subject the control signals to unacceptable co-channel interference due to relatively small distances between cells segments having the same frequency. To overcome this, higher effective channel reuse plan may be created by assigning cell segments to different combinations of frequencies and time. As a result, a higher effective channel reuse pattern that is based on both frequency and time can be achieved as compared to a reuse plan based only on the available frequencies, such as performed in conventional mobile systems. The higher effective channel reuse pattern, e.g., 3/9, 4/12, and other patterns, may be employed in accordance with some embodiments to provide more robust C/I performance. By creating time groups, control signal bursts may be staggered in time to provide both frequency separation and time separation for higher effective channel reuse patterns.

Figure 10:
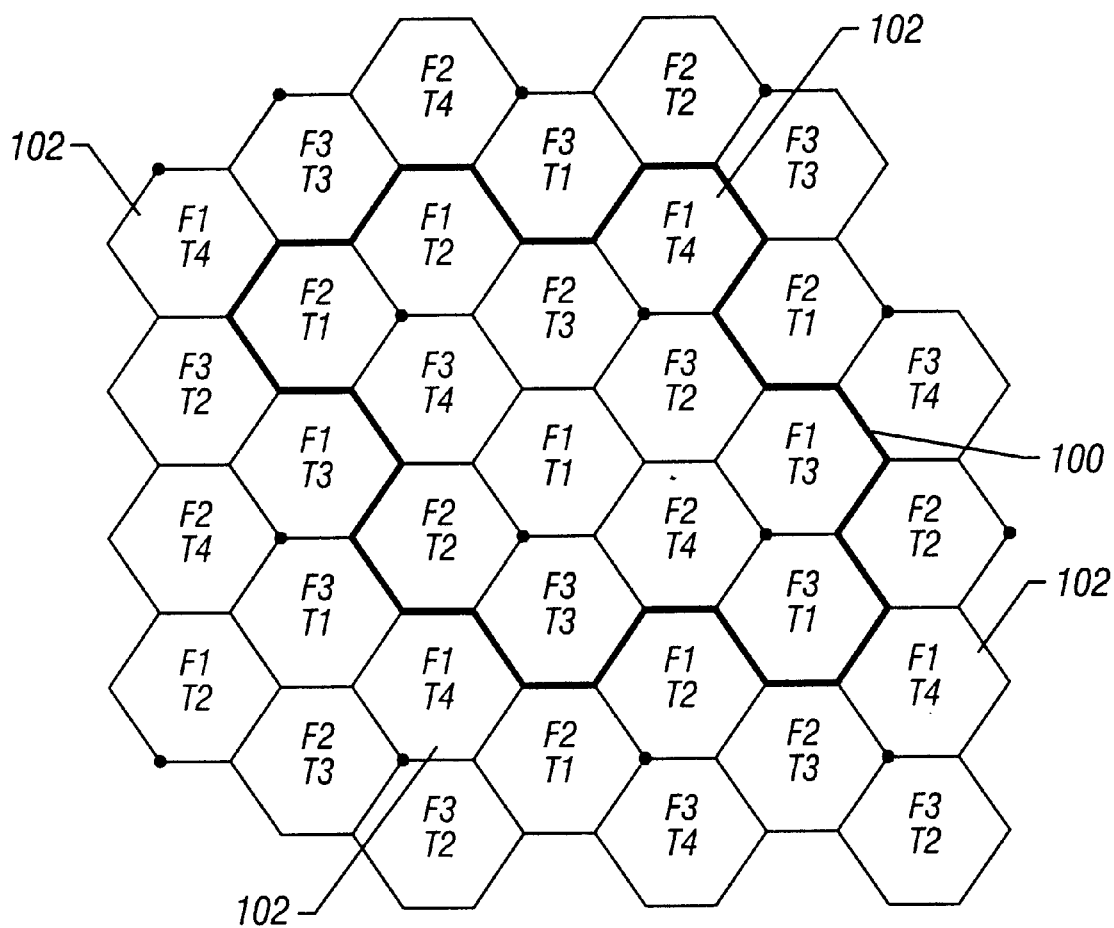
FIGS. 10 and 11 illustrate effective 4/12 and 3/9 channel reuse patterns in accordance with some embodiments that may be employed by the packet-switched data link to carry control signaling in the mobile communication system of FIG. 1.

Referring to FIG. 10, an effective 4/12 channel reuse pattern is illustrated for a cluster of cell sectors that include carriers F1–F3. In the effective 4/12 pattern, four time groups (T1–T4) are created. Thus, in addition to a reuse pattern based on the three carrier frequencies F1–F3, the reuse pattern also has an orthogonal aspect based on time (T1–T4). Thus, each sector is assigned a frequency Fx as well as a time group Ty. With three frequencies F1, F2, and F3 and four time groups T1, T2, T3, and T4, a cluster 100 of 12 sectors can be defined. The cluster 100 is then repeated to provide the effective 4/12 channel reuse pattern. In effect, time reuse that is added on top of frequency reuse creates a higher effective channel reuse pattern for control channels on the packet data link, thereby creating more robust performance with reduced interference problems.

As illustrated in FIG. 10, a sector having a certain frequency Fx in time group Ty is separated by some distance from another sector having the same frequency Fx and being in the same time group Ty (generally the distance provided by the width and length of each cluster 100). For example, the sectors 102 having frequency F1 and belonging to time group T4 are separated by relatively large distances from each other to reduce the likelihood of interference.

Another advantage offered by the effective 4/12 channel reuse pattern as illustrated in FIG. 10 is that adjacent channel interference is reduced between the main F1 and F2 carriers and the main F2 and F3 carriers. For any given sector having frequency Fx and assigned time group Ty, no adjacent sector is assigned the same time group Ty. For example, the sector 102 is associated with F1 and T4. The sectors adjacent the sector 102 are in one of time groups T1–T3 but not T4. Since adjacent sectors are communicating control channels in different time periods, interference between adjacent main carriers (F1, F2, F3) is reduced. As a result, guard bands do not need to be defined between the main carriers F1, F2, and F3, which allows for reduced frequency spectrum allocation for carriers used to communicate packet data.

Figure 11:
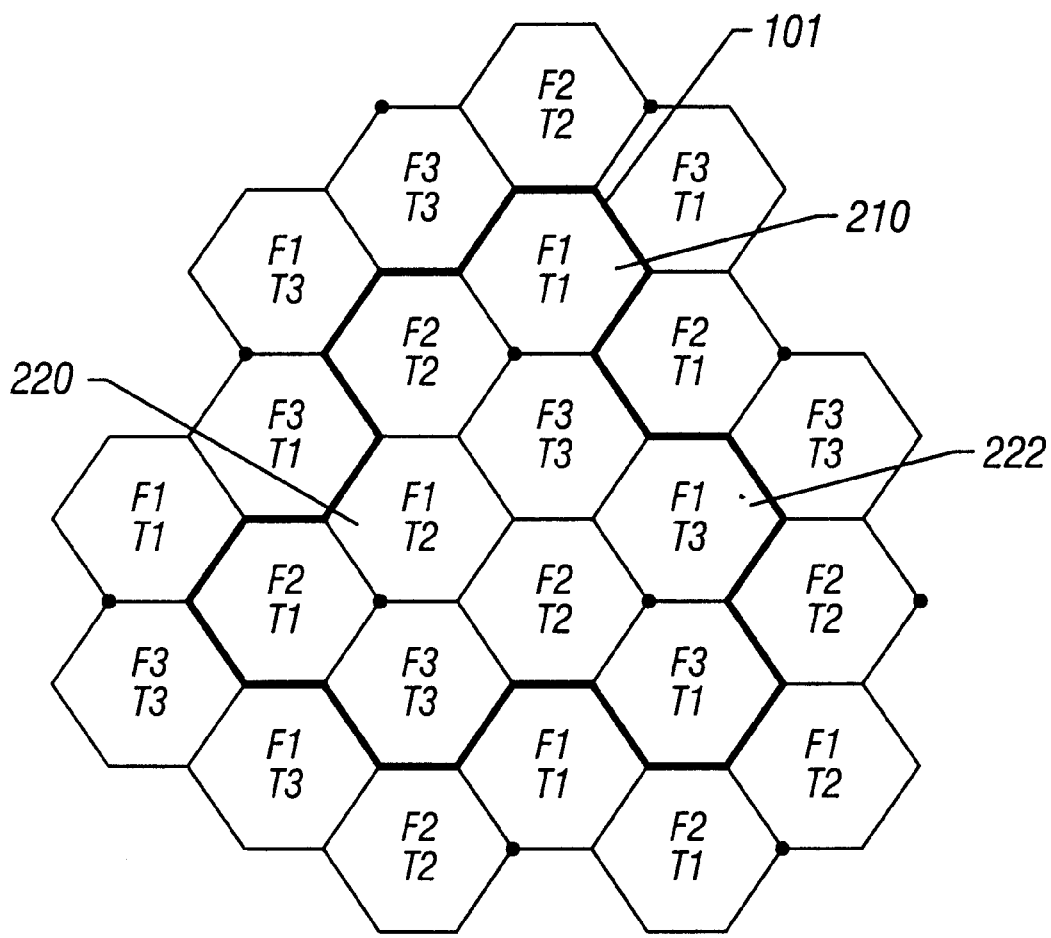

Referring to FIG. 11, an effective 3/9 reuse pattern is illustrated for a cluster 101 including sectors having main carriers F1–F3. The effective 3/9 reuse pattern utilizes three time group T1, T2 and T3. This effectively provides a cluster 101 of nine sectors in which each sector has a distinct combination of a frequency Fx and time group Ty. With the effective 3/9 reuse pattern, the reduced adjacent channel interference feature as offered by the effective 4/12 reuse pattern is not available. To reduce interference between adjacent main carriers F1, F2, and F3, guard bands between the carriers may need to be defined.

To enable the creation of time groups so that they can be allocated among sectors of each cluster (100, 101, or 130) to provide higher effective channel reuse, the base stations 18 are time synchronized with each other. This may be performed by using a global positioning system (GPS) timing receiver or some other synchronization circuit 19 (FIG. 1) in each base station 18. Synchronization of the base station 18 is employed to ensure alignment of the time groups in the cell sectors. Base station synchronization is carried out such that the following two criteria are satisfied. TDMA frames (including time slots TN0–TN7) of the packet data link are aligned with each other in all sectors. Thus, time slot TN0 occurs at the same time at each base station site in each sector, to within tolerances of the synchronization equipment and any differences in propagation delays. Further, according to one embodiment, the control and traffic channels of the data link are carried by a multiframe structure (discussed further below in connection with FIGS. 15–17). Each multiframe structure starts with frame 0 and continues to frame NN (e.g., 50 or 51). When time synchronized, frame 0 occurs at the same time in each sector.

Figure 9:
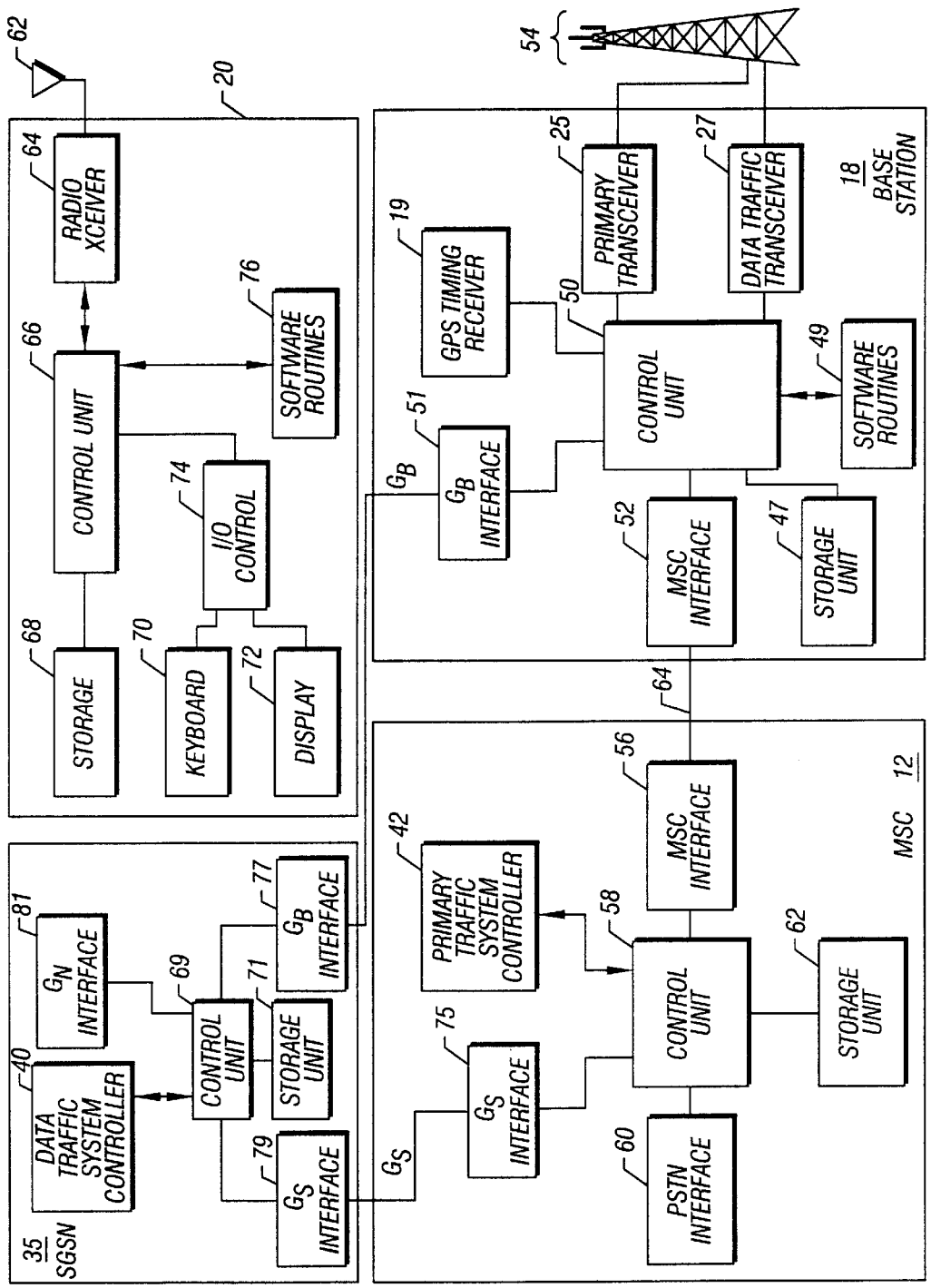
FIG. 9 is a block diagram of components in a mobile switching center (MSC), a base station, a data traffic service node, and a mobile unit in the mobile communications system of FIG. 1.

Referring to FIG. 9, components of the MSC 12, a base station 18, the data traffic service node 35, and a mobile unit 20 are illustrated. Such components are for illustrative purposes and are not intended to limit the scope of the invention. In further embodiments, other architectures of such components may be possible. In the base station 18, the primary traffic transceiver 25 and packet data traffic transceiver 27 are connected to an antenna tower 54 that transmits and receives the first and second sets of carriers 26 and 28. The primary traffic and packet data traffic transceivers 25 and 27 are connected to a control unit 50, on which various software routines 49 may be executable. A storage unit 47 may also be connected to the control unit 50. Also connected to the control unit 50 is a GPS timing receiver or other synchronization circuit 19 that allows synchronization of all base stations in the group of cells 14 controlled by the MSC 12 and data traffic service node 35. Further, the base station 18 includes an MSC interface 52 that is coupled to a link 64 (e.g., a T1 link) that is in turn coupled to an interface unit 56 in the MSC 12. The base station 18 also includes an interface 51 (which in one embodiment is a $G_b$ interface 51 according to GPRS) for communicating over a link (e.g., a $G_b$ link) to the data traffic service node 35.

In the MSC 12, a control unit 58 provides the processing core of the MSC 12. The control unit 58 may be implemented with computer systems, processors, and other control devices. The control unit 58 is connected to a storage unit 62, which may contain one or more machine-readable storage media to store various data as well as instructions of software routines or modules that are loadable for execution by the control unit 58. For example, routines or modules that make up the primary traffic system controller 42 may be stored in the storage unit 62 and loaded for execution by the control unit 58. The MSC 12 may also include a PSTN interface 60 that is coupled to the PSTN 16 to allow communications with a PSTN-connected unit. Further, the MSC 12 includes an interface 75 (e.g., a $G_s$ interface) for communicating over a link (e.g., a $G_s$ link) to the data traffic service node 35.

The data traffic service node 35 includes interface units 77 and 79 for communicating over the $G_b$ and $G_s$ links, respectively, in one embodiment. The processing core of the data traffic service node 35 includes a control unit 69, which may be implemented with computer systems, processors, or other control devices. A storage unit 71 including machine-readable storage media is coupled to the control unit 69. Instructions associated with the routines and modules that make up the data traffic system controller 40 may be initially stored in the storage unit 71 and loaded by the control unit 69 for execution. The data traffic service node 35 further includes an interface 81 (e.g., a $G_n$ interface) for communicating with the GGSN 36 (FIG. 1A). In another embodiment, the interface 81 may be a network interface controller or other transceiver capable of communicating over the data network 32. In further embodiments, the data traffic and primary traffic system controllers 40 and 42 may be implemented in one platform and executable by the same control unit.

Carriers are communicated between the antennas 54 coupled to the base station 18 and an antenna 62 of a mobile unit 20. In one example arrangement of the mobile unit 20, one or more radio transceivers 64 are connected to the antenna 62 to send and receive packet data carriers and primary traffic carriers. A control unit 66 (or one or more other suitable control devices) may be coupled to the one or more radio transceivers 64. The control unit 66 is coupled to a storage unit 68, which may be in the form of a non-volatile memory (such as a flash memory or an electrically erasable and programmable read-only memory) and/or dynamic and static random access memories (DRAMs and SRAMs). Instructions of software routines 68 (including routines described in connection with FIGS. 6–8) executable on the control unit 66 may be initially stored in a non-volatile portion of the storage unit 68. An input/output (I/O) controller 74 is coupled to the keyboard 70 and display 72 of the mobile unit 20.

The primary traffic system controller 42 in the MSC 12, the software routines 49 in the base station 18, software routines 76 in the mobile unit 20, and the data traffic system controller 40 in the data traffic service node 35 may be executed on respective control units. Control units may include microprocessors, microcontrollers, processor cards (including one or more microprocessors or microcontrollers), or other control or computing devices. The instructions of such software routines or modules may be stored in respective storage units each including one or more machine-readable storage media. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). The instructions when executed and loaded by respective control units cause the respective systems or devices to perform programmed acts.

The instructions of the software routines or modules may be loaded or transported into each respective system in one of many different ways. For example, code segments or instructions stored on floppy disks, CD or DVD media, a hard disk, or transported through a network interface card, a modem, or other interface device may be loaded into the system and executed as corresponding software routines or modules. In the loading or transport process, data signals that are embodied in carrier waves (transmitted over telephone lines, network lines, wireless links, cables, and the like) may communicate the code segments or instructions to the respective system or device. Such carrier waves may be in the form of electrical, optical, acoustical, electromagnetic, or other types of signals.

The following describes signaling and frames used in a mobile communications system 10, such as an EGPRS Compact system, in accordance with one embodiment. The described formats are for illustrative purposes only and are not intended to be limiting in any respect.

The control channels employed in the packet data link may include packet broadcast control channels (PBCCH), packet common control channels (PCCCH), and packet data traffic channels (PDTCH). The broadcast control channels PBCCH, communicated downlink (from base station to mobile unit), provide general information on a per base station basis (e.g., cell/sector specific information) including information employed for mobile units 20 to register in the system 10. The common control channels PCCCH carry signaling information used for access management tasks (e.g., allocation of dedicated control channels and traffic channels). PCCCH includes a packet paging channel (PPCH) and a packet access grant channel (PAGCH) for downlink communications, and PCCCH includes a packet random access channel (PRACH) for uplink communications (mobile unit to base station). PRACH is used by a mobile unit 20 to request access to the system 10. PPCH is used by the base station 18 to alert a mobile unit 20 of an incoming call. PAGCH is used to allocate a channel to a mobile unit 20 for signaling to obtain a dedicated channel following a request by the mobile unit 20 on PRACH. Other control channels include a packet frequency correction channel (PFCCH) and a packet synchronization channel (PSCH). PFCCH and PSCH are used to synchronize a mobile unit 20 to the time slot structure of each cell by defining the boundaries of burst periods and time slot numbering. PSCH is used for selection while PFCCH is used for reselection. In one embodiment, the control channels discussed above may be extensions of circuit-switched logical channels used in a GSM system.

The control channels that are communicated with the higher effective 3/9, 4/12, or other channel reuse pattern include PBCCH, PCCCH, PFCCH, and PSCH. The data traffic channels PDTCH and associated traffic control channels, PTCCH (packet timing advance control channel) and PACCH (packet associated control channels) use the 1/3 reuse pattern, since traffic channels employ various mechanisms, as noted above, to better withstand interference from neighboring cell segments.

Figure 12:
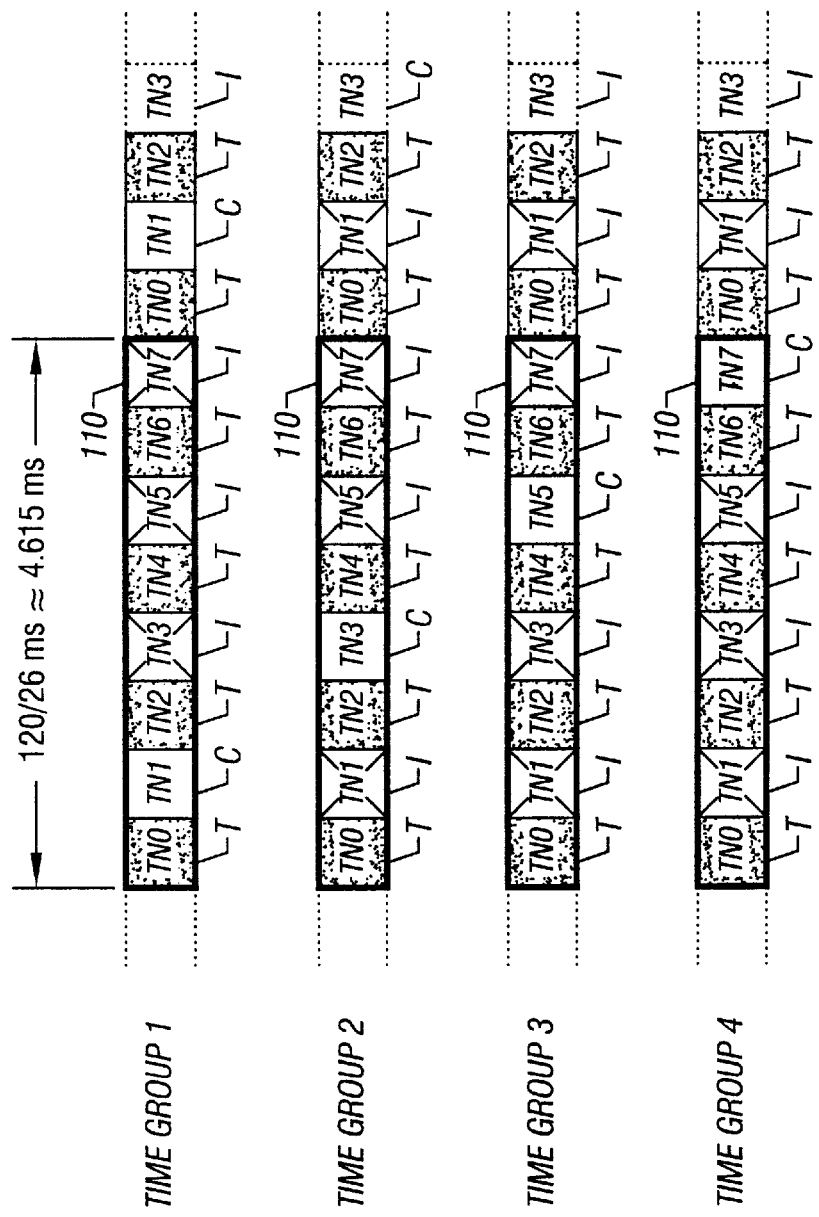

Referring to FIG. 12, each packet data carrier (F1, F2, F3) in the packet data link carries a TDMA frame 110 that is divided into a plurality of time slots. In the illustrated embodiment, eight time slots (or burst periods) TN0–TN7 are used. However, in further embodiments, a carrier may be divided into a smaller or larger number of time slots. In one embodiment, each TDMA frame 110 is structured like a GSM frame and has a length of 120/26 ms (or about 4.615 ms). To provide an effective 4/12 reuse pattern, control channels are staggered across four different time groups. In the illustrated embodiment, in time group 1, control channels (PBCCH, PCCCH, PFCCH, and PSCH in one embodiment) are transmitted during time slot TN1; in time group 2, control channels are transmitted in time slot TN3; in time group 3, control channels are transmitted during time slot TN5; and in time group 4, control channels are transmitted during time slot TN7. By staggering the control channels into different time slots as illustrated, a channel reuse pattern may be divided according to both frequency and time. More generally, in each time group, control signaling may be carried in at least one time slot (less than all the time slots) provided that different sub-groups of time slots are used in different time groups.

As illustrated in FIG. 12, the time slots are marked as one of a T time slot (during which packet data traffic may be communicated), a C time slot (during which control signals may be communicated), and an 1 time slot (during which all traffic and control channels may be idle in blocks that transmit PBCCH and PCCCH on other time groups but which transmit packet data traffic otherwise, as explained below in connection with FIGS. 16A, 16B and 17). In one embodiment, a block includes four frames of a multiframe (e.g., a 51- or 52-frame multiframe).

Figure 13:
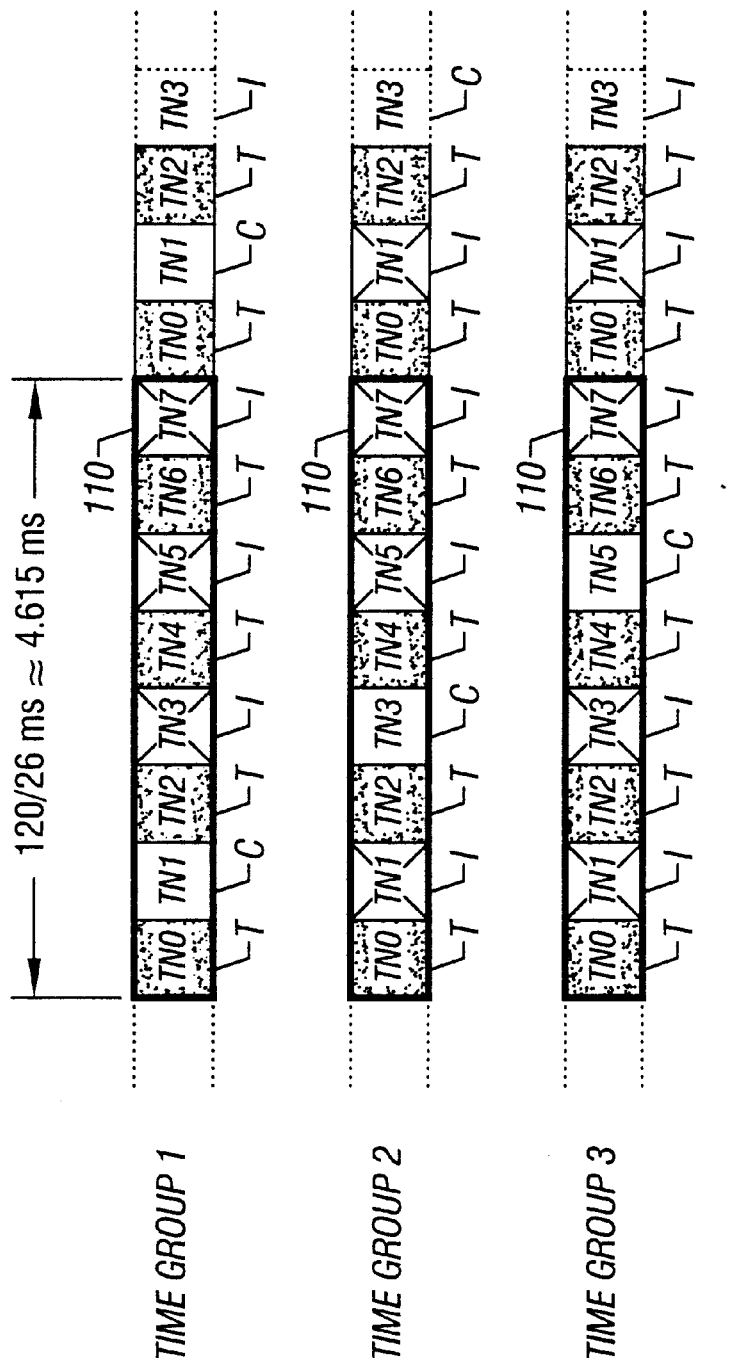

Referring to FIG. 13, in an effective 3/9 reuse pattern including three time groups T1, T2 and T3, the control channels are placed in time slot TN1 (in time group T1, time slot TN3 (in time group T2), and time slot TN5 (in time group T3). The time slots that carry control channels are indicated as being C time slots. Also illustrated in FIG. 13 are T time slots (during which packet data traffic may be transmitted) and 1 time slots (which are idle during blocks that transmit PBCCH or PCCCH in other time groups but which carry packet data traffic otherwise).

In further embodiments, the control channels may be carried in time slots other than TN1, TN3, TN5 or TN7 (FIG. 12) or TN1, TN3, or TN5 (FIG. 13). For example, instead of placing control channels in odd time slots TN1, 3, 5 and 7, the control channels may be placed in time slots TN0, TN2, TN4, and TN6 in the different time groups. Other staggering schemes may also be employed, with some control channels communicated in even time slots and others communicated in odd time slots, for example. Referring to the example of FIG. 14, which shows a 3/9 reuse pattern, control channels may be placed in the C time slots: time slot TN0 in time group 1, time slot TN2 in time group 2, and time slot TN4 in time group 3. The T time slots carry data traffic, and the 1 time slots are idle during blocks that transmit PBCCH or PCCCH in other time groups but carry packet data traffic otherwise. With larger or smaller numbers of time slots, other staggering schemes can be provided to provide fewer or larger numbers of time groups.

Each base station 18 and mobile unit 20 uses a time group number (TG) to indicate the time group the base station 18 and mobile unit 20 is in. The TG number may be carried in the PSCH and PFCCH bursts. In one embodiment in which time slots TN1, 3, 5, and 7 correspond to time groups 1, 2, 3, and 4, the following values of TG indicate the time slot to be used for carrying control channels.

| TG | TN |
|----|----|
| 0  | 1  |
| 1  | 3  |
| 2  | 5  |
| 3  | 7  |

In some embodiments, a time group rotation scheme may be employed, in which the value of TG is rotated through 0, 1, 2, and 3 at predetermined time points. By rotating the value of TG, the time group used for carrying control channels may be rotated in any given cell segment. Thus, if a mobile unit misses a control signal in one time group (such as due to interference from other control signals), it may be able to see the control signal when the cell segment rotates to another time group. Rotation of time groups occur concurrently in all the base station sites so that division of time groups among the sectors is maintained. Rotation may be accomplished by updating the value of TG with each new occurrence of a multiframe.

Figure 16A:
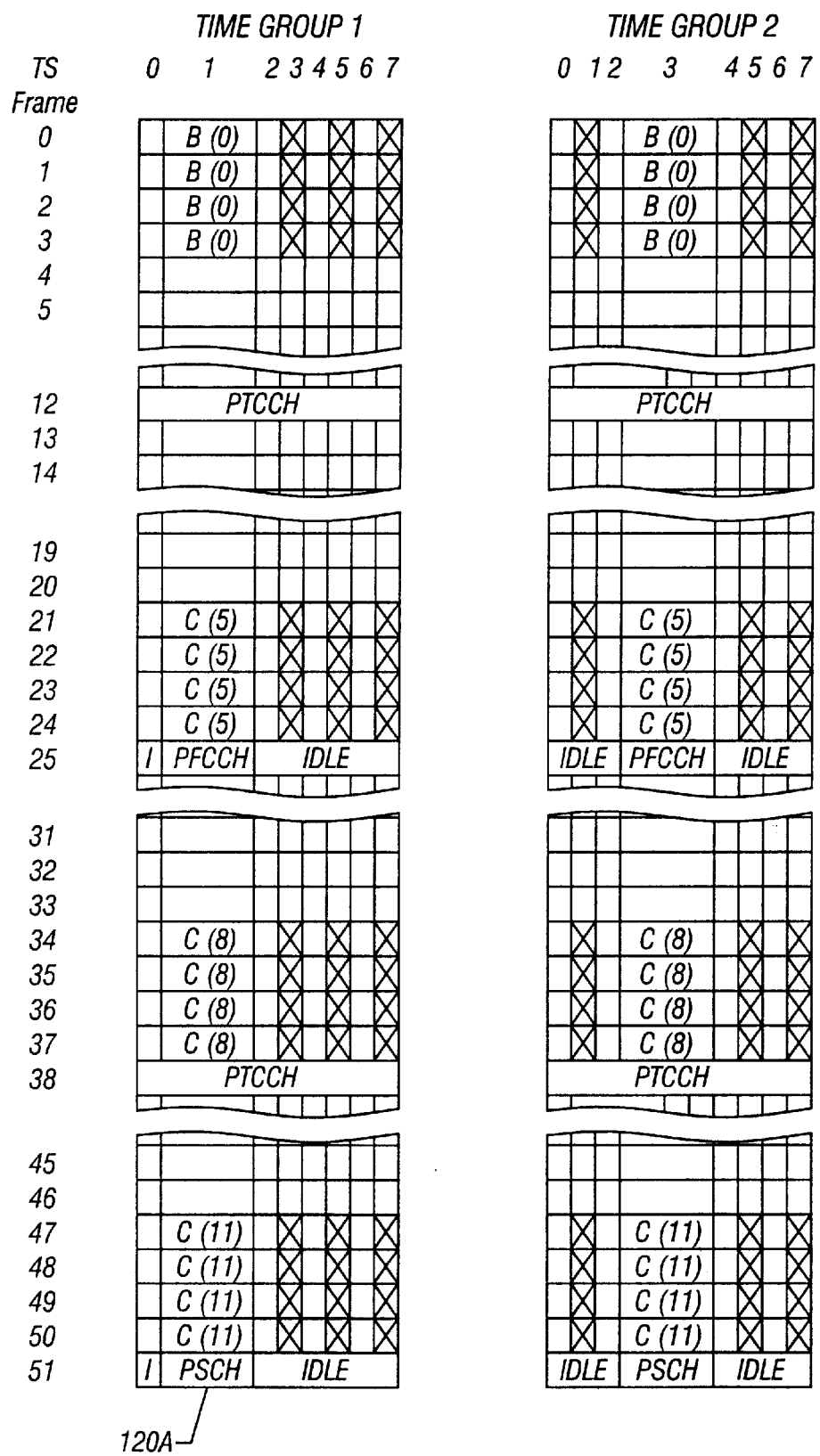
FIGS. 16A, 16B and 17 illustrate multiframes in several time groups in accordance with some embodiments for carrying data traffic and control signaling in the packet-switched data link.
Figure 16B:
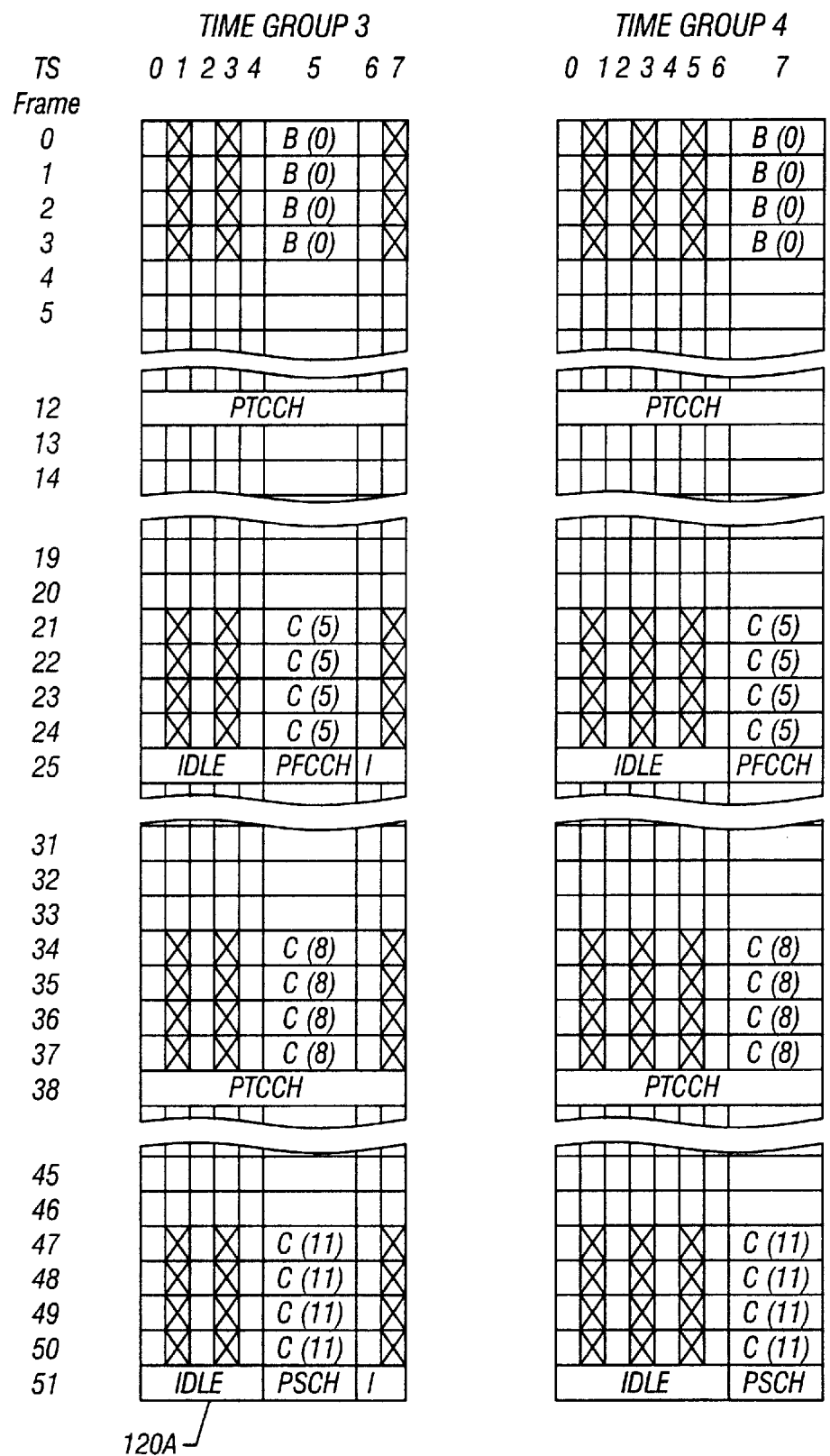
Figure 17:
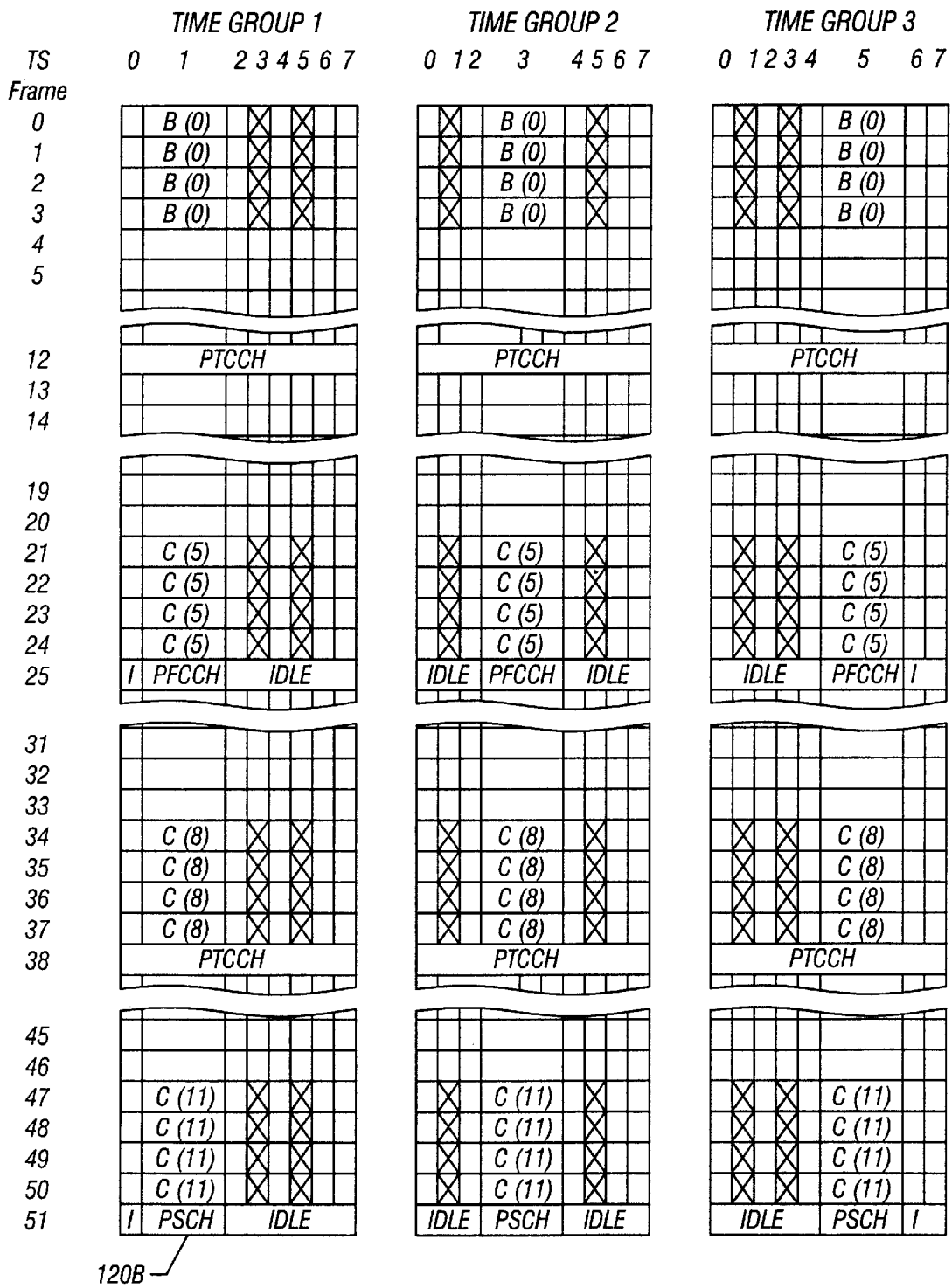

Referring to FIGS. 15–17, communication using 52-frame multiframes 120 in accordance with some embodiments is illustrated. The structure of a multiframe 120 is illustrated in FIG. 15. Each multiframe 120 includes 52 TDMA frames (FRN 0–51), which are divided into 12 blocks B0–B11, leaving four frames FRN 12, 25, 38, and 51 to carry predetermined channels. In further embodiments, other multiframe structures may be used, such as a 51-frame multiframe. For each time group (1, 2, 3, or 4), the eight columns of the multiframe 120 correspond to the eight time slots TN0–TN7, and the 52 rows correspond to the 52 frames of the multiframe 120. FIGS. 16A and 16B illustrate a multiframe structure 120A employing an effective 4/12 reuse pattern, and FIG. 17 illustrates a multiframe structure 120B employing an effective 3/9 reuse pattern.

In the illustrated examples of FIGS. 16A, 16B, and 17, three blocks of each multiframe are assigned to PCCCH (frames containing a C) and one block is assigned to PBCCH (frames containing a B). A block includes four TDMA frames. The number of blocks allocated for PBCCH and PCCCH is flexible, from two up to 12 blocks per time slot in each multiframe 120. In the illustrated examples, PBCCH is carried in block B0, and PCCCH is carried in blocks B5, B8, and B11. Frames FRN 25 and 51 carry PFCCH and PSCH, respectively, and frames FRN 12 and 38 carry PTCCH.

Frames marked with an "X" are idle, and correspond to the odd time slots (TN1, TN3, TN5, or TN7) in blocks (0, 5, 8, and 11) that carry control channels PBCCH and PCCCH in other time groups. Thus, for example, the frames in block B0 in time slot TN3 in each of time groups 1, 3, and 4 are idle because the frames in time slot TN3 of time group 2 carries PBCCH. The same is true also for frames in blocks B5, B8, and B11 in time slots TN1, 3, 5, or 7 that do not carry control signaling.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of measuring co-channel interference in a cell segment of a mobile communications system in which a desired signal of the cell segment is synchronized in time with a plurality of interfering signals of other cells, comprising:

waiting during a time period in which the desired signal and the plurality of interfering signals are all inactive;

receiving a burst on a carrier transmitted by a device in the cell segment during a time period in which the desired signal and the plurality of interfering signals are active, wherein the desired signal includes a transmitted copy of a training sequence;

constructing a representation of the desired signal based upon a stored copy of a training sequence code; and measuring co-channel interference in the cell segment based upon the representation of the desired signal, the transmitted copy of the training sequence of the burst and other components of the burst.

2. The method of claim 1, wherein measuring the co-channel interference includes subtracting the representation of the desired signal from the burst.

3. The method of claim 1, wherein receiving the burst includes a mobile unit receiving the burst from a serving base station.

4. The method of claim 1, wherein receiving the burst includes a serving base station receiving the burst from a mobile unit in the cell segment.

5. The method of claim 1, wherein receiving the burst includes receiving a burst containing both the training sequence and data.

6. The method of claim 5, wherein receiving the burst includes receiving a traffic burst.

7. The method of claim 5, wherein receiving the burst includes receiving a packet associated control channel burst.

8. The method of claim 1, further comprising locally storing the training sequence code, wherein measuring the co-channel interference is based on the local copy of the training sequence code.

9. The method of claim 8, wherein constructing a representation of the desired signal further comprises recreating a version of a transmitted burst using the local copy of the training sequence code.

10. The method of claim 9, wherein measuring the co-channel interference includes comparing the received burst and the recreated version of the transmitted burst.

11. A method of determining co-channel interference in a mobile communications system in which a desired signal of a cell is time synchronized with a plurality of interfering signals of other cells, comprising:

waiting during a time period in which the desired signal and the plurality of interfering signals are all inactive;

receiving a burst containing a training sequence during a time period in which the desired signal and the plurality of interfering signals are active, wherein the burst includes interference caused by the plurality of interfering signals of other cells;

recreating a copy of the burst without interference contribution using a local copy of a training sequence code; and deriving an interference contribution based on the received burst and the recreated copy of the burst.

12. The method of claim 11, wherein deriving the interference contribution is performed at least in part during the training sequence of the received burst.

13. The method of claim 11, wherein receiving the burst includes receiving the burst from a serving base station.

14. The method of claim 13, wherein recreating the copy of the burst includes using the local copy of the training sequence code of the serving base station.

15. The method of claim 11, further comprising using the first N symbols of the training sequence to estimate an equivalent channel response, wherein recreating the copy of the burst is further based on the equivalent channel response.

16. The method of claim 15, wherein deriving the interference contribution is performed for the last M symbols of the training sequence.

17. The method of claim 16, wherein deriving the interference contribution is performed by scanning the training sequence both from left to right and right to left to obtain interference contributions for the first N symbols and the last M symbols.

18. An apparatus for use in a mobile communications system having plural cell segments in which a desired signal of a cell segment and a plurality of interfering signals of other cell segments are time synchronized, the apparatus comprising:

a receiver that waits during a time period in which the desired signal and the plurality of interfering signals are all inactive and that receives a burst containing a training sequence during a time period in which the desired signal and the plurality of interfering signals are active;

a storage device containing a copy of a training sequence code of a serving base station; and a controller adapted to estimate co-channel interference based on the copy of the training sequence code contained in the storage device and the burst.

19. The apparatus of claim 18, further comprising a mobile unit containing the receiver, storage device, and controller.

20. The apparatus of claim 18, further comprising a base station containing the receiver, storage device, and controller.

21. The apparatus of claim 18, wherein the burst includes a packet data traffic channel burst.

22. The apparatus of claim 18, wherein the burst includes a packet associated control channel burst.

23. The apparatus of claim 18, wherein the burst is according to an Enhanced GPRS Compact protocol.

24. An article including one or more machine-readable storage media containing instructions for determining co-channel interference in a mobile communications system having a plurality of cell segments in which a desired signal of a cell segment and a plurality of interfering signals of other cells are time synchronized, the instructions when executed causing a system to:

wait during a time period in which the desired signal and the plurality of interfering signals are all inactive;

receive a burst on a carrier transmitted by a device in the cell segment during a time period in which the desired signal and the plurality of interfering signals are active, wherein the desired signal includes a transmitted copy of the training sequence;

derive a first signal strength value based on a stored training sequence code of a first cell segment;

measure from the burst a second signal strength value contributed by a group of cell segments including the first cell segment; and determine the co-channel interference based on the first signal strength value and the second signal strength value.

25. The article of claim 24, wherein the instructions causing the system to measure the second signal strength value includes causing the system to measure the signal strength value contributed by a group of cell segments having predetermined training sequence codes.

26. The method of claim 24, wherein the instructions causing the system to measure the second signal strength value includes causing the system to measure the signal strength value contributed by a group of synchronized cell segments.

27. An apparatus for determining co-channel interference in a mobile communications system having a plurality of cell segments in which a desired signal of a cell segment and a plurality of interfering signals of other cells are time synchronized, comprising:

means for waiting during a time period in which the desired signal and the plurality of interfering signals are all inactive;

means for receiving a burst on a carrier transmitted by a device in the cell segment during a time period in which the desired signal and the plurality of interfering signals are active, wherein the desired signal includes a transmitted copy of the training sequence;

means for constructing a representation of the desired signal based upon a stored copy of the training sequence; and means for measuring co-channel interference in the cell segment by extracting the representation of the desired signal from the burst and considering a remaining portion of the burst.

28. The apparatus of claim 27, wherein measuring the co-channel interference includes subtracting the representation of the desired signal from the burst.

29. A mobile unit for use in a mobile communications system having time synchronized base stations in which a desired signal of a serving base station is and a plurality of interfering signals transmitted by other base stations are time synchronized, comprising:

an interface that waits during a time period in which the desired signal and the plurality of interfering signals are all inactive and that receives a burst from the serving base station containing a training sequence during a time period in which the desired signal and the plurality of interfering signals are active;

a storage device containing a copy of a training sequence code of a serving base station; and a controller adapted to determine co-channel interference based on the received burst and the copy of the training sequence code.

* * * * *